(12) United States Patent
Onggosanusi et al.

(10) Patent No.: US 10,484,064 B2
(45) Date of Patent: Nov. 19, 2019

(54) METHOD AND APPARATUS FOR DOWNLINK AND UPLINK CSI ACQUISITION

(71) Applicant: Samsung Electronics Co., Ltd., Suwon-si (KR)

(72) Inventors: Eko Onggosanusi, Coppell, TX (US); Hongbo Si, Plano, TX (US); Md. Saifur Rahman, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/690,055

(22) Filed: Aug. 29, 2017

(65) Prior Publication Data

US 2018/0062724 A1    Mar. 1, 2018

Related U.S. Application Data

(60) Provisional application No. 62/382,384, filed on Sep. 1, 2016, provisional application No. 62/384,482, filed
(Continued)

(51) Int. Cl.
*H04W 72/04* (2009.01)
*H04B 7/06* (2006.01)
(Continued)

(52) U.S. Cl.
CPC ......... *H04B 7/0626* (2013.01); *H04B 7/0413* (2013.01); *H04B 7/0478* (2013.01);
(Continued)

(58) Field of Classification Search
USPC .................................. 370/329, 252
See application file for complete search history.

(56) References Cited

U.S. PATENT DOCUMENTS

2014/0036706 A1*  2/2014  Mondal ............... H04W 24/08
                                                       370/252
2015/0124665 A1   5/2015  Park
(Continued)

FOREIGN PATENT DOCUMENTS

WO    2014/073805 A1    5/2014
WO    2016064317 A1     4/2016

OTHER PUBLICATIONS

"3rd Generation Partnership Project; Technical Specification Group Radio Access Network; Evolved Universal Terrestrial Radio Access (E-UTRA); Physical channels and modulation (Release 12)," Technical Specification 3GPP TS 36.211 V12.4.0, Dec. 2014, 124 pages.
(Continued)

*Primary Examiner* — Eva Y Puente

(57) ABSTRACT

Methods and apparatuses for CSI reporting mechanisms are provided. A user equipment (UE) includes a transceiver configured to receive configuration information for channel state information (CSI) calculation and reporting. The configuration information includes settings comprising at least one CSI reporting setting, at least one reference signal (RS) setting, and a measurement setting. The UE also includes a processor operably connected to the transceiver. The processor is configured to decode the configuration information and calculate CSI according to the settings, The transceiver is further configured to transmit the calculated CSI on an uplink (UL) channel.

20 Claims, 13 Drawing Sheets

Related U.S. Application Data on Sep. 7, 2016, provisional application No. 62/395,748, filed on Sep. 16, 2016, provisional application No. 62/413,136, filed on Oct. 26, 2016, provisional application No. 62/426,925, filed on Nov. 28, 2016, provisional application No. 62/479,459, filed on Mar. 31, 2017.

(51) Int. Cl.
  *H04B 7/0413* (2017.01)
  *H04L 5/00* (2006.01)
  *H04B 7/0456* (2017.01)
  *H04W 88/02* (2009.01)
  *H04W 88/08* (2009.01)

(52) U.S. Cl.
  CPC .......... *H04L 5/0048* (2013.01); *H04L 5/0053* (2013.01); *H04L 5/0055* (2013.01); *H04B 7/068* (2013.01); *H04B 7/0628* (2013.01); *H04W 72/042* (2013.01); *H04W 88/02* (2013.01); *H04W 88/08* (2013.01)

(56) References Cited

U.S. PATENT DOCUMENTS

| | | | |
|---|---|---|---|
| 2015/0215090 | A1 | 7/2015 | Sayana et al. |
| 2015/0244444 | A1* | 8/2015 | Mazzarese ............... H04B 7/04 370/252 |
| 2016/0105817 | A1 | 4/2016 | Frenne et al. |
| 2016/0149629 | A1* | 5/2016 | Zhang ................... H04L 1/0026 370/329 |
| 2016/0233938 | A1 | 8/2016 | Mondal et al. |
| 2018/0013478 | A1* | 1/2018 | Chen .................... H04B 7/0626 |
| 2018/0091207 | A1* | 3/2018 | Kakishima ........... H04B 7/0626 |
| 2018/0091208 | A1* | 3/2018 | Mazzarese ............ H04L 5/0094 |

OTHER PUBLICATIONS

"3rd Generation Partnership Project; Technical Specification Group Radio Access Network; Evolved Universal Terrestrial Radio Access (E-UTRA); Multiplexing and channel coding (Release 12)," Technical Specification 3GPP TS 36.212 V12.3.0, Dec. 2014, 89 pages.

"3rd Generation Partnership Project; Technical Specification Group Radio Access Network; Evolved Universal Terrestrial Radio Access (E-UTRA); Physical layer procedures (Release 12)," Technical Specification 3GPP TS 36.213 V12.4.0, Dec. 2014, 225 pages.

"3rd Generation Partnership Project; Technical Specification Group Radio Access Network; Evolved Universal Terrestrial Radio Access (E-UTRA); Medium Access Control (MAC) protocol specification (Release 12)," Technical Specification 3GPP TS 36.321 V12.4.0, Dec. 2014, 60 pages.

"3rd Generation Partnership Project; Technical Specification Group Radio Access Network; Evolved Universal Terrestrial Radio Access (E-UTRA); Radio Resource Control (RRC); Protocol specification (Release 12)," Technical Specification 3GPP TS 36.331 V12.4.0, Dec. 2014, 410 pages.

"3rd Generation Partnership Project; Technical Specification Group Services and System Aspects; Feasibility Study on New Services and Markets Technology Enablers; Stage 1 (Release 14)," Technical Report 3GPP TR 22.891 V1.2.0, Nov. 2015, 96 pages.

International Search Report and Written Opinion, dated Dec. 15, 2017, regarding International Application No. PCT/KR2017/009594, 9 pages.

CATT, "Further considerations on CSI reporting for hybrid CSI-RS", 3GPP TSG RAN WG1 Meeting #86, R1-168047, Aug. 2016, 3 pages.

Samsung, "Enhancement on Full-Dimension (FD) MIMO for LTE", 3GPP TSG RAN Meeting #72, Jun. 13-16, 2016, 9 pages, RP-160894.

Session Chairman (Samsung, Nokia), "Chairman's Notes of Agenda Item 7.2.4 on Enhancements on Full-Dimension (FD) MIMO for LTE", 3GPP TSG RAN WG1 Meeting #86, Aug. 22-26, 2016, 10 pages, R1-168405.

Supplementary European Search Report dated Jul. 4, 2019 in connection with European Patent Application No. 17 84 7041, 12 pages.

* cited by examiner

METHOD AND APPARATUS FOR DOWNLINK AND UPLINK CSI ACQUISITION

CROSS-REFERENCE TO RELATED APPLICATIONS AND CLAIM OF PRIORITY

This application claims priority under 35 U.S.C. § 119(e) to:
U.S. Provisional Patent Application Ser. No. 62/382,384 filed Sep. 1, 2016;
U.S. Provisional Patent Application Ser. No. 62/384,482 filed Sep. 7, 2016;
U.S. Provisional Patent Application Ser. No. 62/395,748 filed Sep. 16, 2016
U.S. Provisional Patent Application Ser. No. 62/413,136 filed Oct. 26, 2016
U.S. Provisional Patent Application Ser. No. 62/426,925 filed Nov. 28, 2016; and
U.S. Provisional Patent Application Ser. No. 62/479,459 filed Mar. 31, 2017;
The above-identified provisional patent applications are hereby incorporated by reference in their entirety.

TECHNICAL FIELD

The present disclosure relates generally to methods for enabling uplink MIMO. Such methods can be used when a user equipment is equipped with a plurality of transmit antennas and transmit-receive units.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CSI reporting.

In one embodiment, a user equipment (UE) is provided. The UE includes a transceiver configured to receive configuration information for channel state information (CSI) calculation and reporting. The configuration information includes settings comprising at least one CSI reporting setting, at least one reference signal (RS) setting, and a measurement setting. The UE also includes a processor operably connected to the transceiver. The processor is configured to decode the configuration information and calculate CSI according to the settings, The transceiver is further configured to transmit the calculated CSI on an uplink (UL) channel.

In another embodiment, a base station (BS) is provided. The BS includes a processor configured to generate configuration information for CSI calculation and reporting. The configuration information includes at least one CSI reporting setting, at least one RS setting, and a measurement setting. The BS also includes a transceiver operably connected to the processor. The transceiver is configured to transmit, to the UE, the configuration information via a DL channel and receive, from the UE, a CSI report calculated in accordance with the configuration information.

In another embodiment, a method for operating a UE is provided. The method includes receiving, by the UE, configuration information for CSI calculation and reporting. The configuration information includes settings comprising at least one CSI reporting setting, at least one RS setting, and a measurement setting. The method further includes decoding, by the UE, the configuration information; calculating, by the UE, CSI according to the settings; and transmitting, by the UE, the calculated CSI on an uplink (UL) channel.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
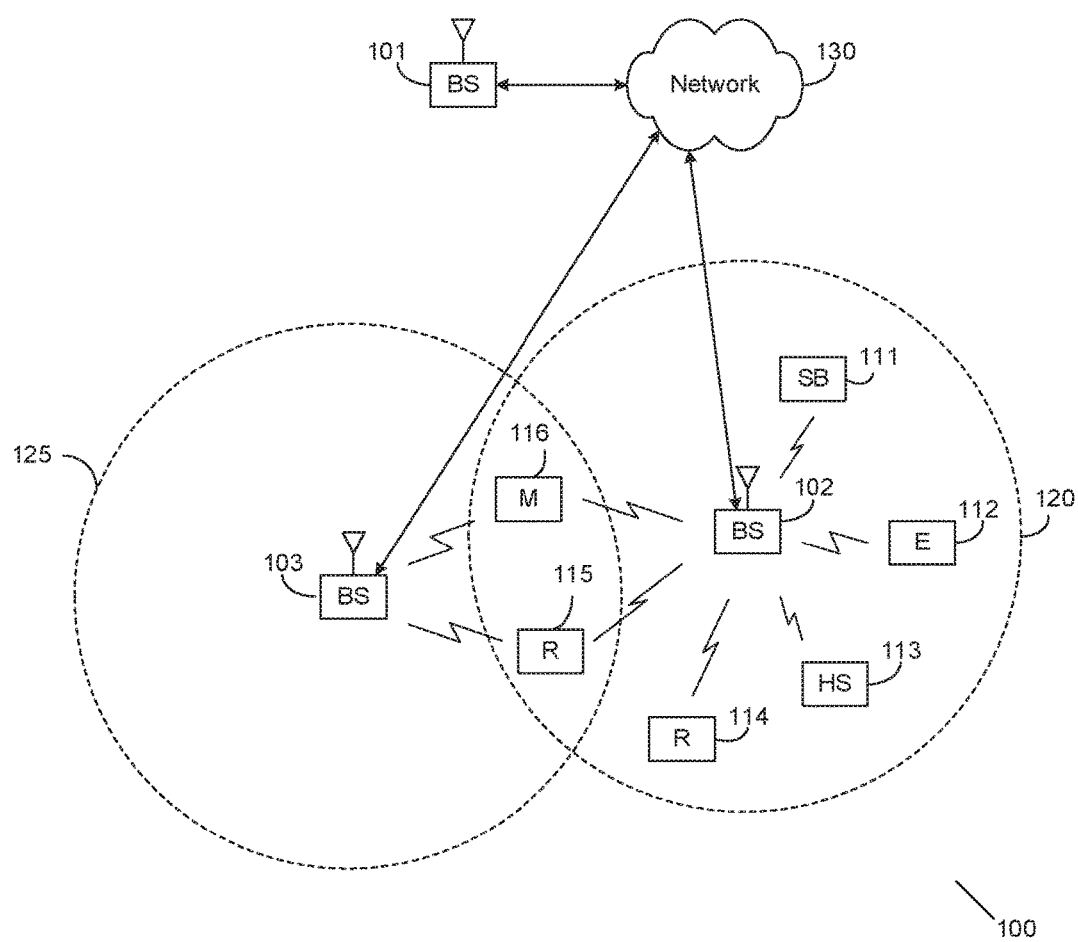
FIG. 1 illustrates an example wireless network according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an alternative term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for CSI reporting as described in embodiments of the present disclosure. In various embodiments, one or more of UEs 111-116 receive CSI acquisition configuration information and transmit CSI reports accordingly.

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
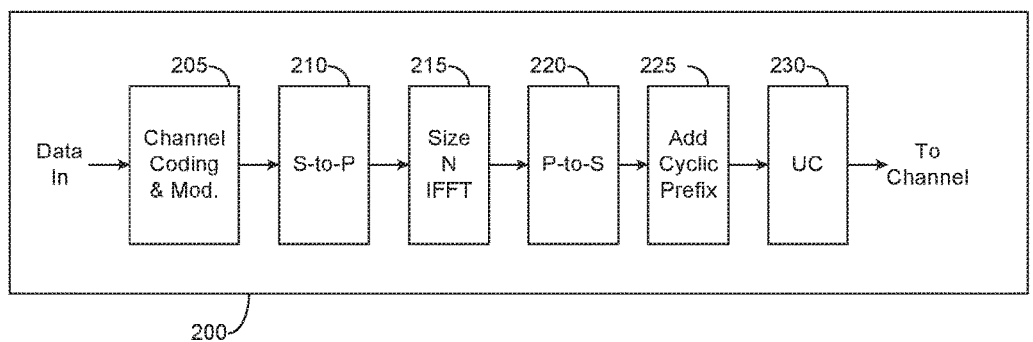
FIGS. 2A and 2B illustrate example wireless transmit and receive paths according to various embodiments of the present disclosure.
Figure 2B:
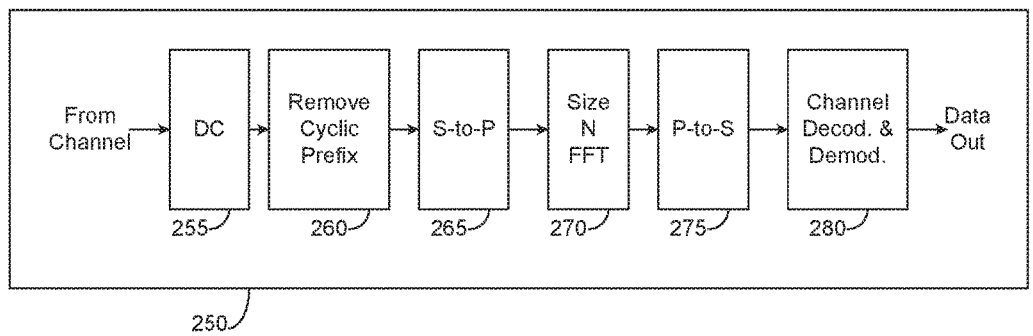

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to CSI acquisition configuration information and transmit CSI reports accordingly as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
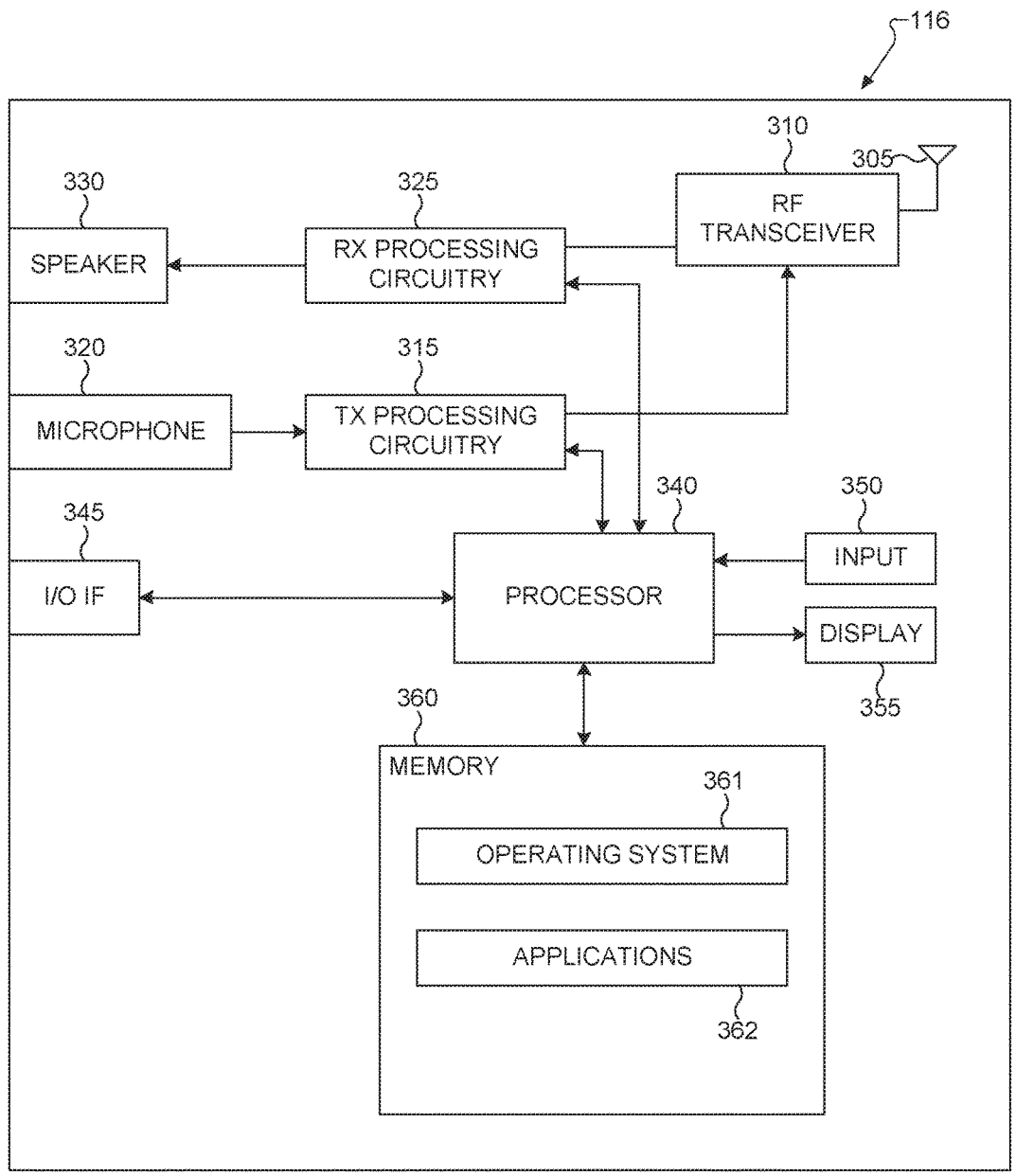
FIG. 3A illustrates an example user equipment according to various embodiments of the present disclosure.

FIG. 3A illustrates an example UE 116 according to the present disclosure.

The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
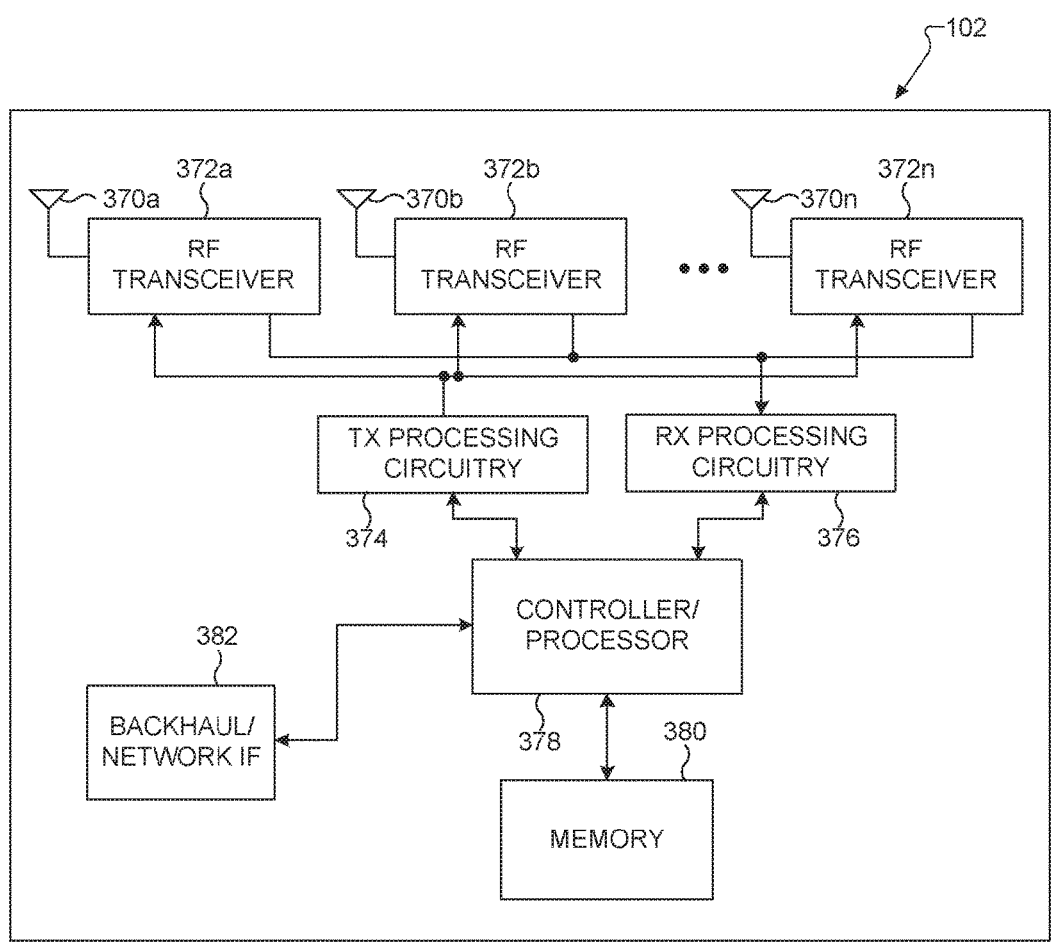
FIG. 3B illustrates an example base station (BS) according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 could support communications over any suitable wired or wireless connection(s). For example, when the gNB 102 is implemented as part of a cellular communication system (such as one supporting 5G or new radio access technology or NR, LTE, or LTE-A), the backhaul or network interface 382 could allow the gNB 102 to communicate with other gNBs over a wired or wireless backhaul connection. When the gNB 102 is implemented as an access point, the backhaul or network interface 382 could allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) perform configuration and signaling for CSI acquisition.

Although FIG. 3B illustrates one example of a gNB 102, various changes can be made to FIG. 3B. For example, the gNB 102 could include any number of each component shown in FIG. 3A. As a particular example, an access point could include a number of backhaul or network interfaces 382, and the controller/processor 378 could support routing functions to route data between different network addresses.

As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel. 14 LTE. For next generation cellular systems such as 5G, it is expected that the maximum number of CSI-RS ports remain more or less the same.

Figure 4:
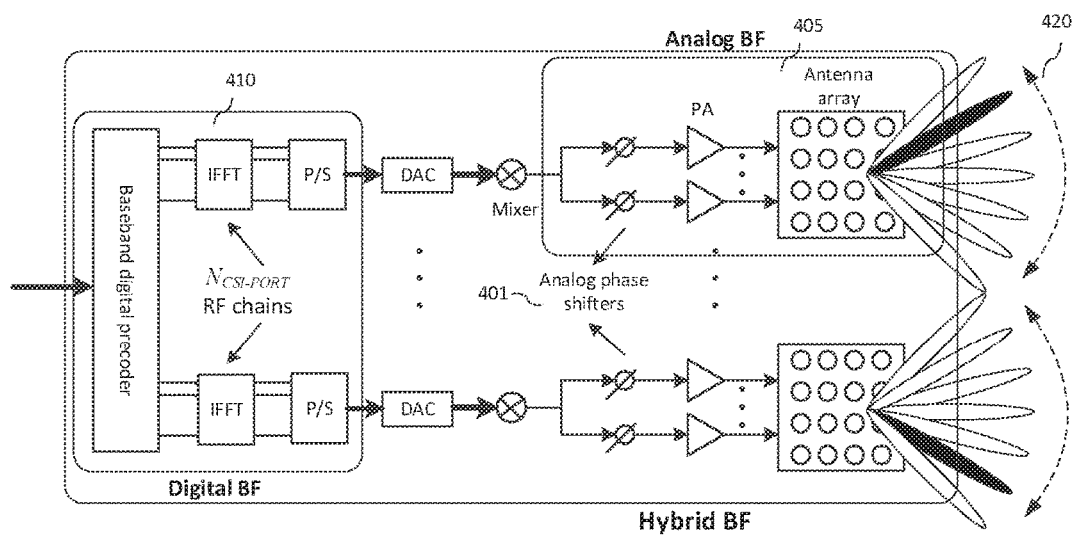
FIG. 4 illustrates an example beamforming architecture wherein one CSI-RS port is mapped onto a large number of analog-controlled antenna elements.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in embodiment 400 of FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols). The number of sub-arrays (equal to the number of RF chains) is the same as the number of CSI-RS ports $N_{CSI\text{-}PORT}$. A digital beamforming unit 410 performs a linear combination across $N_{CSI\text{-}PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement behavior are supported in Rel.13 LTE: 1) 'CLASS A' CSI reporting which corresponds to non-precoded CSI-RS; 2) 'CLASS B' reporting with K=1 CSI-RS resource which corresponds to UE-specific beamformed CSI-RS; and 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (which includes multiple ports). Here, (at least at a given time/frequency) CSI-RS ports have narrow beam widths and hence not cell wide coverage, and (at least from the gNB perspective) at least some CSI-RS port-resource combinations have different beam directions.

In scenarios where DL long-term channel statistics can be measured through UL signals at a serving gNB, UE-specific BF CSI-RS can be readily used. This is typically feasible when UL-DL duplex distance is sufficiently small. When this condition does not hold, however, some UE feedback is used for the gNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE, a number of CSI reporting modes exist for both periodic (PUCCH-based) and aperiodic (PUSCH-based) CSI reporting. Each CSI reporting mode is dependent on (coupled with) many other parameters (e.g. codebook selection, transmission mode, eMIMO-Type, RS type, number of CRS or CSI-RS ports). At least two drawbacks can be perceived. First, complex "nested loops" (IF . . . ELSE . . . ) and webs of couplings/linkages exist. This complicates testing efforts. Second, forward compatibility is limited especially when new features are introduced.

While the above drawbacks apply to DL CSI measurement, the same can be said for UL CSI measurements. In LTE, UL CSI measurement framework exists in a primitive form and is not as evolved as its DL counterpart. In the advent of TDD or reciprocity-based systems for next generation systems along with the likely prominence of OFDMA or OFDMA-based multiple access for UL, a same (or at least similar) CSI measurement and reporting framework applicable for both DL and UL is beneficial.

Therefore, considering the above new challenges for 5G NR systems, there is a need for a flexible and modular CSI measurement and reporting frameworks which is applicable for DL and UL.

The present disclosure includes the following components for enabling CSI acquisition for both DL and UL. A first component includes a framework and its associated embodiments for supporting DL CSI acquisition. A second component includes frameworks and embodiments for supporting UL CSI acquisition. A third component includes another framework and its associated embodiments for supporting DL CSI acquisition.

For the first component (that is, a DL CSI acquisition framework), a DL CSI framework is designed partly to facilitate DL CSI acquisition at the gNB/TRP. This involves either DL CSI reporting from a UE, DL CSI measurement of UL signal(s) at the gNB/TRP (for DL-UL reciprocity-based operation), or both.

In one example embodiment, for a single UE, a DL CSI framework includes at least one CSI reporting setting, at least one RS setting (which includes at least one RS used for CSI measurements), and one CSI measurement setting. A CSI reporting setting configures a UE with CSI reporting parameters which need to be calculated and reported. An RS setting configures a UE with one or more RS resources for the purpose of CSI measurement and calculation. For instance, one of the configured RSs can be a CSI-RS, which also includes a special case of CSI-IM (hence zero power CSI-RS). A CSI measurement setting provides linkage/coupling between CSI reporting and RS settings.

It is noted that the above designations (CSI reporting setting, RS setting, and CSI measurement setting) are exemplary and only for illustrative purposes. Other designations can also be used to represent the functionalities. For example RS setting can be termed Resource setting or CSI Resource setting, signifying resource configuration for signals (such as reference signals) utilized for measurements. Examples of signals that can be used for reference signals include CSI-RS, DMRS (demodulation reference signal), or SRS (sounding reference signal).

Figure 5A:
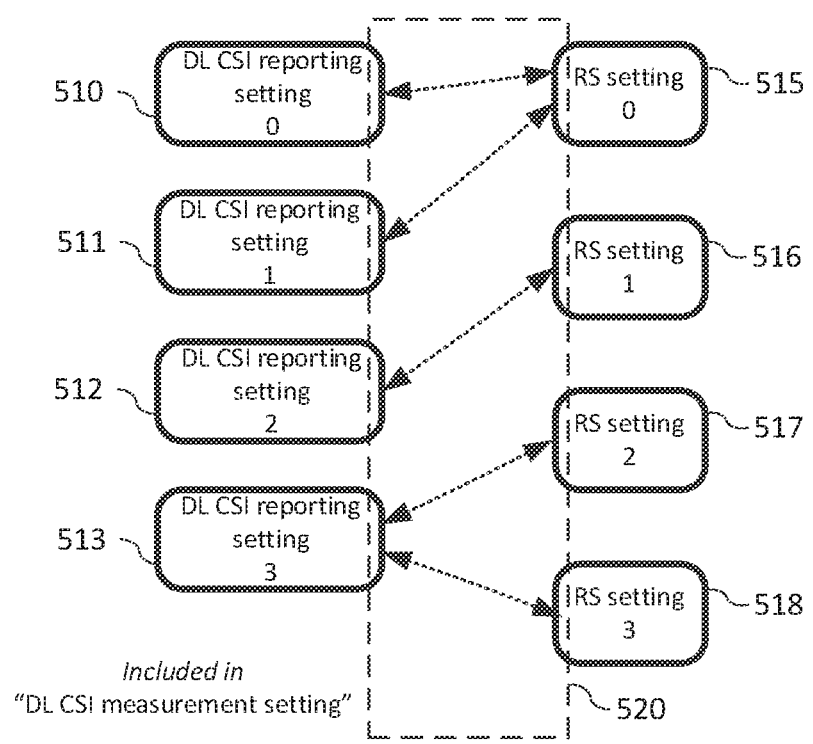
FIG. 5A illustrates an example embodiment for DL with four CSI reporting settings and four reference signal settings according to an embodiment of the present disclosure.

For example, when a UE is configured with N CSI reporting settings and M RS settings, the CSI measurement setting links each of the N CSI reporting settings with at least one of the M RS settings. This is illustrated in FIG. 5A where N=4 (CSI reporting setting indexed by 0, 1, 2, and 3 which are associated with embodiments 510, 511, 512, and 513, respectively) and M=4 (RS setting indexed by 0, 1, 2, and 3 which are associated with embodiments 515, 516, 517, and 518, respectively).

The CSI measurement setting can be described as follows. The four CSI reporting settings and four RS settings are linked with CSI measurement setting 520. In this example, CSI reporting setting 0 and 1 are linked with RS setting 0. CSI reporting setting 2 is linked with RS setting 1. On the other hand, CSI reporting setting 3 is linked with RS settings 2 and 3. The last example, where one CSI reporting setting is linked with two RS settings, is applicable for hybrid CSI operation (where one RS setting is cell- or TRP-specific or gNB-specific and the other one is UE-specific and beam-formed) and CoMP (where one RS setting is associated with one interference hypothesis and the other one with another). In general, there can be L≥1 linkages included in the CSI measurement setting that link N CSI reporting settings and M RS settings.

In addition to the above linkages, timing relationships between CSI reporting and its corresponding RS can be included in the CSI measurement setting. For instance, when CSI reporting setting 0 is associated with RS setting 0, the UE behavior is defined as follows. When the UE receives an RS associated with RS setting 0 in subframe or slot n, the UE shall report a CSI associated with CSI reporting setting 0 in subframe or slot $n+D_{0\text{-}0}$ where the parameter $D_{0\text{-}0}$ is configurable. In the example depicted in FIG. 5A, there are at least five of such parameters ($D_{0\text{-}0}$, $D_{1\text{-}0}$, $D_{2\text{-}1}$, $D_{3\text{-}2}$, and $D_{3\text{-}3}$). Optionally, each link can be associated with a set of possible values wherein the value applied for a particular measurement and reporting instance can be selected dynamically from the set of values.

In addition, measurement restriction (not only the location, but also the extent to which CSI is measured in time domain, frequency domain, or both) associated with each linkage can be included in the CSI measurement setting.

In addition, quasi-colocation (QCL) among more than one antenna ports can be included in the CSI measurement setting.

At least one of (or combination of several of) the above example contents of CSI measurement setting can be chosen to form a CSI measurement setting.

In a variation of the above embodiment, instead of utilizing one CSI measurement setting which includes all the (L≥1) linkages between N CSI reporting settings and M RS settings, L≥1 separate CSI measurement settings (one CSI measurement setting per one linkage) can be utilized. In this case, one CSI measurement setting can include at least one of the following: a linkage, timing relationship, measurement restriction, and/or QCL. Detailed descriptions for utilizing L≥1 CSI measurement settings follow those for one CSI measurement setting.

The above settings can be configured for a UE via higher-layer (RRC) signaling or MAC control element (MAC CE) or L1 control signaling (DL control signaling via a DL control channel). Several possibilities exist. First, all the above settings (CSI reporting setting, RS setting, and CSI measurement setting) can be configured either via higher-layer (RRC) signaling or MAC control element (MAC CE). Second, CSI reporting setting and RS setting can be configured via higher-layer (RRC) signaling, while CSI measurement setting can be configured via MAC control element (MAC CE). Third, CSI reporting setting and RS setting can be configured via higher-layer (RRC) signaling, while CSI measurement setting can be configured via L1 control signaling (DL control signaling via a DL control channel). Fourth, CSI reporting setting and CSI measurement setting can be configured via higher-layer (RRC) signaling, while RS setting can be configured via L1 control signaling (DL control signaling via a DL control channel).

Optionally, for at least one of the above three settings, some of the setting parameters can be configured via higher-layer (RRC) signaling or MAC CE, while some other setting parameters can be configured via L1 DL control signaling (using either UL-related or DL-related DCI). Some examples will be given below.

DL transmission scheme/method is configured separately. How DL transmission scheme/method is used in conjunction with CSI-related setting is left to gNB implementation. Optionally, this DL transmission scheme can be used as a condition for CQI calculation.

As described below, time-domain behavior of CSI reporting, DL CSI-RS and UL SRS transmissions include periodic (P), semi-persistent (SP), and aperiodic (AP). Several possible embodiments are given as follows.

In one example embodiment, CSI reporting setting can be selected dynamically for aperiodic and semi-persistent CSI reporting. When a UE is configured with n>1 CSI reporting settings wherein each of the n CSI reporting settings aperiodic CSI reporting is configured, the DCI used to trigger the aperiodic CSI report can include a CSI reporting setting index (which indicates the associated one of n CSI reporting settings), either as a separate DCI field or a part of the CSI request field. Likewise, when a UE is configured with n'>1 CSI reporting settings wherein each of the n' CSI reporting settings semi-persistent CSI reporting is configured, the DCI or MAC CE used to activate the semi-persistent CSI report can include a CSI reporting setting index (which indicates the associated one of n' CSI reporting settings), either as a separate field or a part of the activation message. This embodiment further applies when all the configured links between each CSI reporting setting and all the RS settings cannot be dynamically selected. That is, when a CSI reporting setting is dynamically selected, all the RS settings linked to the selected CSI reporting setting are used for CSI measurement.

In another example embodiment, RS or Resource setting can be selected dynamically for aperiodic and semi-persistent CSI reporting. When a UE is configured with m>1 RS or Resource settings wherein each of the m RS settings aperiodic CSI-RS is configured, the DCI used to trigger the aperiodic CSI report can include an RS setting index (which indicates the associated one of m RS settings), either as a separate DCI field or a part of the CSI request field. Likewise, when a UE is configured with m'>1 RS settings wherein each of the m' RS settings semi-persistent CSI-RS is configured, the DCI used to trigger the aperiodic CSI report, or the DCI or MAC CE used to activate the semi-persistent CSI report can include an RS setting index (which indicates the associated one of m' CSI reporting settings), either as a separate field or a part of the activation message or (for aperiodic CSI reporting) a part of the CSI request field. This embodiment further applies when all the configured links between each RS setting and all the CSI reporting settings cannot be dynamically selected. That is, when an RS setting is dynamically selected, all the CSI reporting settings linked to the selected RS setting are active.

The above embodiment applies to other types of RSs such as SRS. It also applies to either non-zero-power (NZP) or zero-power (ZP) CSI-RS or SRS.

In another example embodiment, both CSI reporting setting and RS/Resource setting can be selected dynamically for aperiodic and semi-persistent CSI reporting. In this case, what can be dynamically signaled is the selected link within the CSI measurement setting (where a total of L links are included). When a UE is configured with l>1 links set for aperiodic CSI reporting, the DCI used to trigger the aperiodic CSI report can include a link index (which indicates the associated one of l links), either as a separate DCI field or a part of the CSI request field. Likewise, when a UE is configured with l'>1 links set for semi-persistent CSI reporting, the DCI or MAC CE used to activate the semi-persistent CSI report can include a link index (which indicates the associated one of l' links), either as a separate DCI field or a part of the activation message. When link-based dynamic signaling is used, the UE can measure a resource/RS from different RS setting for a same CSI reporting setting depending on the selected/triggered link.

Figure 5B:
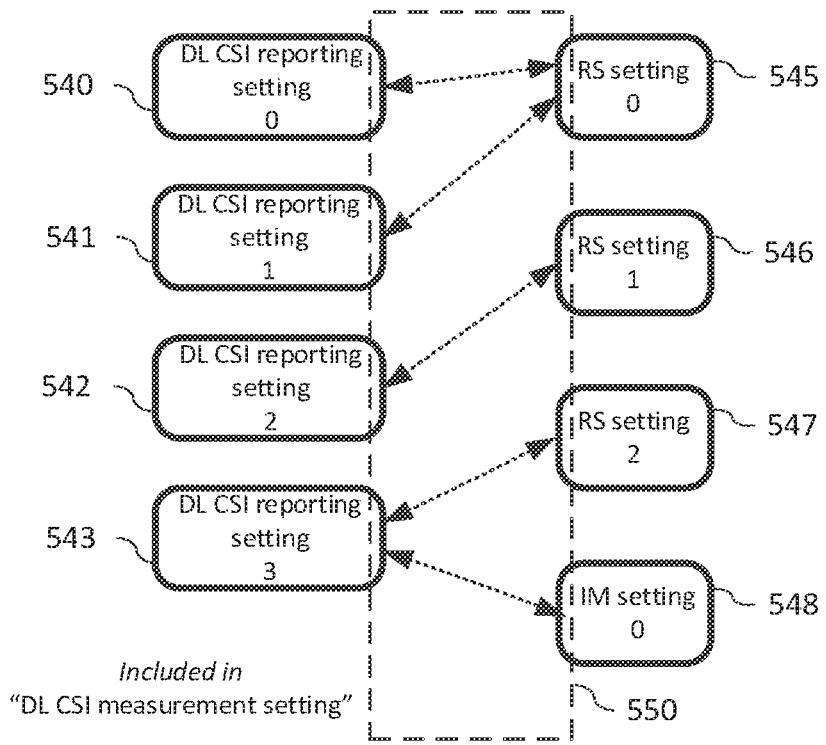
FIG. 5B illustrates an example embodiment for DL with four CSI reporting settings, three reference signal settings, and one interference measurement setting according to an embodiment of the present disclosure.

In the above embodiments for the first component (for DL CSI), RS used for interference measurement (IM, or CSI-IM) is included in the RS setting (for example, in RS Power setting, RS Type, and/or RS Function). In an optional embodiment, instead of including RS used for IM in the RS setting, a separate IM (interference measurement) setting can be used. In this case, a UE can be configured with one CSI measurement setting which includes all the (L≥1) linkages between N CSI reporting settings, M RS settings, and P IM settings. This is illustrated in FIG. 5B where L=5 linkages are included in the CSI measurement setting 550 along with N=4 CSI reporting settings (540, 541, 542, and 543), M=3 RS settings (545, 546, and 547), and P=1 IM setting (548). The content of an IM setting can include at least one of the contents of an RS setting as disclosed in the above descriptions pertaining to the first component.

In a variation of the above optional embodiment, instead of utilizing one CSI measurement setting which includes all the (L≥1) linkages between N CSI reporting settings, M RS settings, and P IM settings, L≥1 separate CSI measurement settings (one CSI measurement setting per one linkage) can be utilized. In this case, one CSI measurement setting can include at least one of the following: a linkage, timing relationship, measurement restriction, and/or QCL. Detailed descriptions for utilizing L≥1 CSI measurement settings follow those for one CSI measurement setting. Using the example in FIG. 5B, L=5 separate CSI measurement settings are used.

Figure 5C:
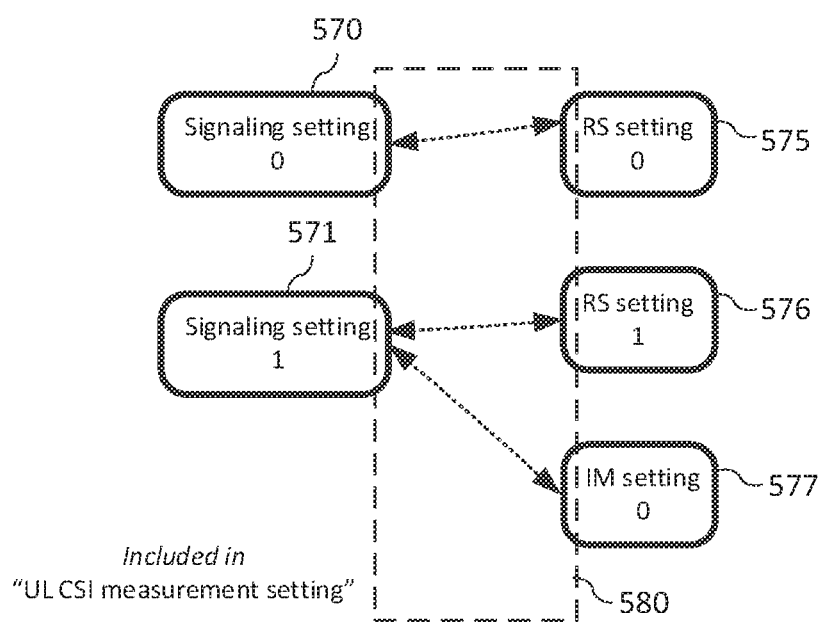
FIG. 5C illustrates an example embodiment for UL with two DL signaling settings, two reference signal settings, and one interference measurement setting according to an embodiment of the present disclosure.

This variation is also applicable to the second component (to be described later) where instead of including RS used for IM in the RS setting, a separate IM setting can be used. For example, when a UE is configured with N signaling settings, M RS settings, and P IM settings, the CSI measurement setting links each of the N signaling settings with at least one of the M RS settings and P IM settings. This is illustrated in FIG. 5C where N=2 (DL signaling setting indexed by 0 and 1 which are associated with embodiments 570 and 571, respectively), M=2 (RS setting indexed by 0 and 1 which are associated with embodiments 575 and 576, respectively), and P=1 (IM setting indexed by 0 which is associated with embodiments 577).

The following embodiments pertain to a sub-component on the setting for DL CSI reporting (denoted in the present disclosure as sub-component 1.1).

Figure 6:
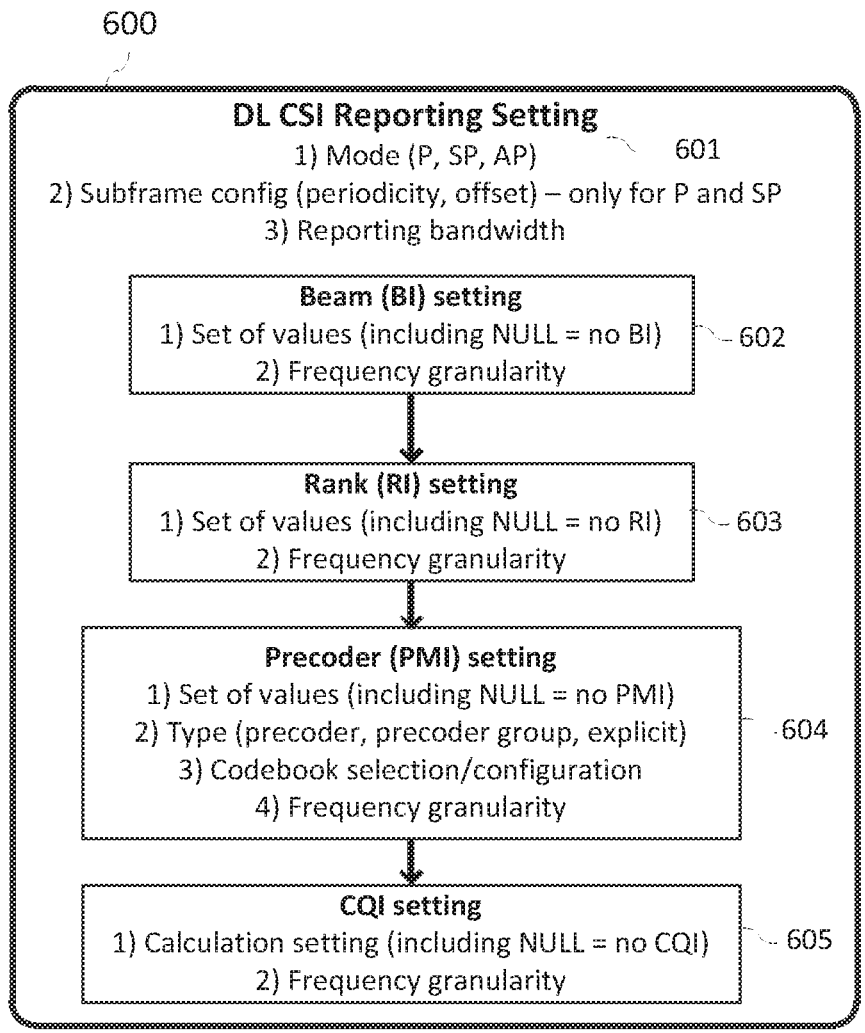
FIG. 6 illustrates an example CSI reporting setting according to an embodiment of the present disclosure.

An example of DL CSI reporting setting 600 is illustrated in FIG. 6. Here, a CSI reporting setting includes first a general setting information 601 such as (but not limited to) "Mode" (whether CSI reporting is periodic, aperiodic/on-demand, or semi-persistent/multi-shot), subframe or slot configuration which includes subframe or slot offset and periodicity (which is only applicable for periodic and/or semi-persistent/multi-shot), and reporting bandwidth (the amount of DL frequency-domain resource—possibly including location—associated with the DL CSI reporting). The "Mode" configuration denotes the manner in which DL CSI reporting is performed in time-domain. "Mode" takes value from {periodic, aperiodic/on-demand, semi-persistent/multi-shot}. It is also possible that "Mode" only takes value from, e.g. {periodic, aperiodic/on-demand} or {periodic, semi-persistent/multi-shot} or {aperiodic/on-demand, semi-persistent/multi-shot}.

In the example embodiment, settings 600 for four CSI parameters are included: BI (beam indicator/index), RI (rank indicator), PMI (precoding matrix indicator), and CQI (channel quality indicator). In LTE, BI is equivalent to CRI (CSI-RS resource indicator) since one beam is formed according to one CSI-RS resource. When all these four CSI parameters are reported within one CSI reporting setting: the value of BI is chosen, RI is calculated conditioned on the current BI within the same setting, PMI is calculated conditioned on the current BI and RI, and CQI is calculated conditioned on the current BI, RI, and PMI. When any of these four CSI parameters is not reported but is fixed to a certain value (hence requiring no reporting), the aforementioned conditioning rule still applies. When any of these four CSI parameters is neither reported nor fixed to a certain value, this unreported CSI parameter does not condition the calculation of a subsequent CSI parameter. For example, if BI is neither reported nor fixed to a certain value (set to NULL in setting 602), the value of RI is chosen, PMI is calculated conditioned on the current RI, and CQI is calculated conditioned on the current RI and PMI.

Although this embodiment includes four CSI parameters, other CSI parameters can also be included (or only a subset of these four parameters can be used, or a subset of these four parameters in conjunction with other parameters). The use of four CSI parameters (hence four CSI parameter settings) in the preceding and following discussions are exemplary and for illustrative purposes.

In addition to the general setting information 601, a sub-setting can be defined for each of the four CSI parameters. For example, in setting 602, a BI setting can include a possible set of values and frequency granularity. For example, when the set of values is {0, 1, 2, 3}, a 2-bit BI can be reported. When the set of values is {2}, BI reporting does not have to be performed. But the value of BI is set to 2 (i.e. the UE is configured with beam #2). When the set of values is NULL, BI is not reported and is unused in this CSI reporting setting. If frequency granularity is set to, e.g. 20 RBs, BI is calculated and reported for each of the 20-RB subbands. In 803, analogous to 802, an RI setting can also include a possible set of values and frequency granularity. For example, when the set of values is {1, 2}, a 1-bit RI can be reported. When the set of values is {2}, RI reporting does not have to be performed. But the value of RI is set to 2 (i.e. the UE shall assume RI=2 for its CSI calculation). When the set of values is NULL, RI is not reported and is unused in this CSI reporting setting.

In setting 604, a PMI setting can include a possible set of values, "Type", codebook selection/configuration, and frequency granularity. The set of values and frequency granularity are defined analogously to those of BI or RI. PMI "Type" can include a possible set of types such as 'precoder' (which indicates a choice of precoding vector or matrix taken from a codebook), 'precoder group' (which indicates a group/subset of precoding vectors or matrices taken from a codebook), or 'explicit' (which indicates explicit feedback, e.g. channel quantization, eigenvector quantization, based on either a channel quantizer or a codebook). Codebook selection/configuration can include information pertinent to the selection of a codebook for PMI reporting.

In setting 605, a CQI setting can include CQI calculation setting and frequency granularity. Frequency granularity can be defined analogously to those of BI, RI, or PMI. CQI calculation setting, whose set of possible values includes NULL (CQI is not reported and in unused in this CSI reporting setting), can indicate a CQI calculation procedure. In one example of CQI calculation procedure option, CQI can be calculated by assuming data transmission along one precoder indicated/recommended by the value of PMI. In another example of CQI calculation procedure option, CQI can be calculated by assuming data transmission along a plurality of precoders indicated/recommended by the value of PMI, where precoder cycling is performed. That is, the precoder is altered either across frequency domain, time domain, or both. In yet another example of CQI calculation procedure option, CQI can be calculated to represent the power of an associated RS (based on an RS setting linked to this DL CSI reporting setting via a DL CSI measurement setting). In this case, CQI can function analogously to RSRP. In addition, the number of bits (payload size) of CQI can either be configurable as a part of CQI setting, or be associated with CQI calculation setting.

The above chosen names are exemplary and for illustrative purposes.

In any of the above examples, the value NULL, indicating non-existence, can be replaced by another value designation which offers a same functionality.

The following embodiments pertain to a sub-component on the setting for DL CSI measurement (denoted in the present disclosure as sub-component 1.2).

An example of RS setting used for DL CSI measurement is given in the following embodiment.

An RS setting can include "RS type" which is the type of RS used for DL CSI measurements. Some examples of "RS type" include DL CSI-RS, UL CSI-RS (or SRS—which is used for DL CSI measurement for reciprocity-based operation), DL DMRS, UL DMRS, and an RS functionally equivalent to beam RS (BRS). In a sub-embodiment, supported "RS type" can include at least one of the aforementioned types. In another sub-embodiment, supported "RS type" includes DL CSI-RS and UL-CSI-RS (or SRS). In this sub-embodiment, two RS settings can be associated with either one or two CSI reporting settings so that both DL CSI-RS and UL CSI-RS (or SRS) can be utilized for CSI calculation.

An RS setting can also include "RS Bandwidth" which indicates the amount of DL (for DL CSI-RS) or UL (for UL CSI-RS or SRS) frequency-domain resources—possibly including location—occupied by the RS transmission. This can correspond to the "Reporting Bandwidth" setting of DL CSI Reporting Setting.

An RS setting can also include "RS Resource parameters" which can include several parameters such as the number of RS beams/resources K (that is, within one RS resource configuration/setting, either one or a plurality of RS beams/resources can be configured—functionally analogous to LTE with Class B eMIMO-Type and K≥1 NZP CSI-RS resources), the K associated RS resource identities or indices, the number of RS ports for each RS beam/resource $\{N_1, N_2, \ldots, N_K\}$, "RS Pattern", "RS Power", and "RS Function".

Regarding the use of "RS Resource Parameters", a UE can be configured with K NZP CSI-RS resources via higher-layer (RRC) signaling while a size-N subset of the K CSI-RS resources (K≥N) can be selected or activated (for measurement or monitoring at the UE side). The selection of size-N subset can be done either via MAC control element (MAC CE) signaling or L1 DL control signaling (either UL-related or DL-related DCI). In this case, if "RS Resource Parameters" are included in RS setting which is configured via higher-layer (RRC) signaling, the number of RS resources K and the associated resource indices/identities are included in "RS Resource Parameters", but not the selection of size-N subset is performed. The value of N, on the other hand, can be configured either via higher-layer (RRC) signaling or via MAC CE signaling (together with the selection of size-N subset).

The utilization of "RS Resource Parameters" and subset selection of RS resources described in the previous paragraph can be utilized for DL CSI-RS, UL CSI-RS (SRS), and/or other types of RS. In addition, a common resource pool/set for DL CSI-RS and UL CSI-RS (SRS) can be used.

An "RS Pattern" indicates RS pattern configuration in time (within one OFDM symbol) and frequency domain (across REs, that is, selecting one out of multiple RE patterns). Such plurality of possible patterns can also include patterns with different RE densities. This pattern can be defined either separately for each or jointly for all of the K≥1 RS beams/resources for a given number of RS beams/resources K.

An RS pattern of an N-port RS (such as DL CSI-RS or SRS) can also correspond to an aggregation of a plurality of RS resources wherein each resource corresponds to a smaller number of ports. For example, an N-port CSI-RS can be composed of K CSI-RS resources wherein the number of ports for the K CSI-RS resources are $\{N_1, N_2, \ldots, N_K\}$, respectively, and that $N_1+N_2+ \ldots +N_K=N$. This aggregation can be included or signaled as a part of higher-layer (RRC) configuration, MAC CE, L1 DL control signaling, or a combination of the three. For example, a UE can be configured with a plurality of possible RS aggregation patterns and one of these aggregation patterns is selected or activated dynamically via MAC CE or L1 DL control signaling. Optionally, a UE can be configured with a plurality of possible RS aggregation patterns and a smaller subset of these aggregation patterns is selected or activated dynamically via MAC CE, and one of these aggregation patterns in the activated subset is selected via L1 DL control signaling.

An "RS Power" indicates the power level of RS relative to a power setting associated with data transmission. For instance, this can be represented by the energy-per-RE or EPRE (such as $\rho_A$, $P_B$, and $P_C$ analogous to LTE). This RS power setting can also include ZERO which denotes zero-power RS (analogous to ZP CSI-RS used for CSI-IM in LTE). Just as "RS Pattern", "RS Power" can be defined either separately for each or jointly for all of the K≥1 RS beams/resources for a given number of RS beams/resources K.

If only ZP CSI-RS can be used for CSI-IM, the RS used for CSI-IM (interference measurement) can be differentiated from the RS used for channel measurement simply from the power setting. Therefore, there is no need further differentiation between the two. However, if other interference measurement mechanisms, such as CSI-IM using NZP CSI-RS or DL DMRS, are possible, RS power alone may not be sufficient to differentiate the RS used for channel measurement from that used for interference measurement. In this case, an additional indication for IM or CSI-IM can be used. This indication can be included in, e.g., RS Type (above) or RS Function (below).

An "RS Function" indicates whether the RS functions as a 'UE-specific RS' or a 'coverage RS' (non-UE-specific or gNB-specific or beam-specific RS). In general, UE-specific RS can be dynamically precoded/beamformed specifically for a UE, while non-UE-specific RS can be cell-specific or gNB-specific or beam-specific (intended for coverage, which can include K≥1 RS beams/resources). In addition, when the number of RS beams/resources K≥1, "RS Function" can also indicate whether beam sweeping is performed across K RS beams in time-domain (for example, across K different and consecutive OFDM symbols, either within one subframe/slots/TTI or across multiple subframes/slots/TTIs). This beam sweeping can be performed for either DL CSI-RS or UL CSI-RS (SRS).

Such different RS functions can be enumerated, e.g. "RS Function"=1 denotes UE-specific RS functionality, "RS Function"=2 non-UE-specific or TRP/gNB-specific RS functionality (with K≥1 RS beams/resources), while "RS Function"=3 the use of K≥1 consecutive OFDM symbols for transmitting K≥1 RS beams/resources. For this last functionality, each instance of RS transmission (in one OFDM symbol) can be associated with one RS beam/resource. For DL CSI-RS, the UE shall assume that the RS received across K>1 consecutive OFDM symbols via DL correspond to K>1 DL RS beams/resources. For UL CSI-RS, the UE shall assume that the RS transmitted across K>1 consecutive OFDM symbols via UL correspond to K>1 UL RS beams/resources. Therefore, beam sweeping is applicable for both DL and UL CSI-RS.

For some scenarios, further simplification is possible. For example, when "RS Type" is set to UL CSI-RS, the setting for "RS Function" for UL CSI measurement can be simplified by merging "UE-specific" and "non-UE-specific" into one value (for instance, "default" which is applicable to non-sweeping operation). This is because UL CSI-RS (SRS) is UE-specific. In addition, when "RS Type" is set to DL or UL DMRS (if applicable), "RS Function" is not needed since DMRS is not present in subframes/slots/TTIs where data transmission for the UE is non-existent.

Analogous to DL CSI reporting setting, an RS setting can also include "RS Mode" (whether CSI reporting is periodic, aperiodic/on-demand, or semi-persistent/multi-shot). The "Mode" configuration denotes the manner in which the associated RS is transmitted in time-domain. "Mode" takes value from {periodic, aperiodic/on-demand, semi-persistent/multi-shot}. It is also possible that "Mode" only takes value from, e.g. {periodic, aperiodic/on-demand} or {periodic, semi-persistent/multi-shot} or {aperiodic/on-demand, semi-persistent/multi-shot}.

When "RS Mode" is either periodic or semi-persistent ("multi-shot"), an RS setting can also include "RS Subframe or Slot Configuration" which indicates periodicity and subframe/slot offset associated with RS transmissions. Such "RS Subframe or Slot Configuration" can be configured either separately for each or jointly for all of the K RS beams/resources.

The above chosen names are exemplary and for illustrative purposes. An RS setting in this disclosure includes at least one of the above settings or sub-settings.

Regarding the use of "RS Function", some sub-embodiments can be described as follows when the number of RS resources or beams K is larger than 1.

In one sub-embodiment, "RS Function", either included or not included as a part of RS setting, is configured via higher-layer (RRC) signaling. "RS Function" indicates whether the RS is non-UE-specific RS (coverage RS) or UE-specific RS. In addition to this first signaling, a second signaling which indicates a transmission of the RS resource (SRS via uplink or DL CSI-RS via downlink) associated with either one RS resource/beam identity/indicator or a plurality of RS resource identities/indicator is performed. This second signaling is performed either via MAC CE or L1 DL control signaling (either UL-related or DL-related DCI). For example, when this second signaling indicates the transmission of only one RS resource/beam, a resource/beam index can be signaled via L1 DL control signaling (e.g. carried in a DCI field). Optionally, a precoding matrix indicator (PMI) defined based on a codebook can be signaled via an L1 DL control signaling (e.g. carried in a DCI field). This last option can be relevant for UL CSI-RS (SRS) wherein this PMI indicates the precoder that the UE applies to SRS transmission. On the other hand, when this second signaling indicates the transmission of a plurality of RS resources/beams, a beam sweeping operation where RSs associated with the plurality of resources/beams are transmitted across time and/or frequency units. For example, sweeping across N beams can signify N consecutive SRS transmissions in time. Either a predetermined sweeping/cycling pattern is defined or a selected sweeping/cycling pattern (out of a plurality of options) is signaled via L1 DL control signaling (e.g. carried in a DCI field).

In another sub-embodiment, "RS Function", either included or not included as a part of RS setting, is configured via MAC CE. "RS Function" indicates whether the RS is non-UE-specific RS (coverage RS) or UE-specific RS. In addition to this first signaling, a second signaling which indicates a transmission of the RS resource (SRS via uplink or DL CSI-RS via downlink) associated with either one RS resource/beam identity/indicator or a plurality of RS resource identities/indicator is performed. This second signaling is performed via L1 DL control signaling (either UL-related or DL-related DCI). For example, when this second signaling indicates the transmission of only one RS resource/beam, a resource/beam index can be signaled via L1 DL control signaling (e.g. carried in a DCI field). Optionally, a precoding matrix indicator (PMI) defined based on a codebook can be signaled via an L1 DL control signaling (e.g. carried in a DCI field). This last option can be relevant for UL CSI-RS (SRS) wherein this PMI indicates the precoder that the UE applies to SRS transmission. On the other hand, when this second signaling indicates the transmission of a plurality of RS resources/beams, a beam sweeping operation where RSs associated with the plurality of resources/beams are transmitted across time and/or frequency units. For example, sweeping across N beams can signify N consecutive SRS transmissions in time. Either a predetermined sweeping/cycling pattern is defined or a selected sweeping/cycling pattern (out of a plurality of options) is signaled via L1 DL control signaling (e.g. carried in a DCI field).

Each of the above two sub-embodiments can be used for DL CSI-RS and UL CSI-RS (SRS).

When any of the above sub-embodiments is used for SRS and the second signaling utilizes L1 DL control signaling (via either UL-related or DL-related DCI), the following example schemes can be used based on the above optional schemes.

In one example (example 1), when a DCI (UL-related or DL-related) includes an indication of SRS resource index—either separately from or a part of SRS transmission request DCI field—the associated DCI field includes at least one hypothesis to perform beam sweeping (consecutive transmissions of SRS associated with several SRS resources across time and/or frequency units) across N≤K SRS resources in addition to hypotheses indicating selection of 1 out of K (or 1 out of N) SRS resources. As described above, the K SRS resources can be configured via higher-layer (RRC) signaling or MAC CE. Likewise, the value of N can be configured via higher-layer (RRC) signaling or MAC CE or signaled as a part of the SRS resource index indication. The number of SRS resources is denoted as N which can be equal to K (configured via higher-layer signaling) or less than K. When N<K, a subset of K resources can be selected for the purpose of SRS triggering (in case of aperiodic SRS) or SRS activation (in case of semi-persistent or multi-shot SRS). An example of such definition of SRS transmission request (SRS trigger) DCI field for aperiodic SRS is given in TABLE 1.

TABLE 1

Example SRS triggering scheme

| Code point/codeword of SRS trigger DCI field (in decimal) | Interpretation |
| --- | --- |
| 0 | No SRS transmission requested |
| 1 | Transmit SRS with resource index 0 |
| 2 | Transmit SRS with resource index 1 |
| . | . |
| . | . |
| . | . |
| N − 1 | Transmit SRS with resource index (N − 1) |
| N | Transmit SRS by sweeping across N resources |

In another example (example 2), an UL-related or DL-related DCI includes a PMI which indicates a precoder the UE uses for precoding SRS. In this case, the PMI (termed $PMI_{SRS}$ in the present disclosure) is used to indicate a precoder chosen from a codebook. For UL-related DCI, $PMI_{SRS}$ can either be a second (additional) PMI different from the PMI used for the granted UL transmission on PUSCH or a same PMI as that used for the granted UL data/UCI transmission on PUSCH (termed TPMI in Component 2). For the latter case, the function of the PMI field (either for SRS or for PUSCH data/UCI transmission) can be configured via higher-layer (RRC) signaling (for example, either with an RRC parameter indicating PMI function or a higher-layer indication of SRS type such as 'Non-precoded' or 'Precoded'), MAC CE, or indicated in the same DCI. If indicated in the same DCI, this indicator can either be a separate 1-bit field (for example, called 'PMI Function' field) or jointly encoded into the PMI field. Optionally, when a single PMI is used for SRS and for the granted UL data/UCI transmission on PUSCH, the same precoder indicated by the PMI can be used for (applied to) both SRS and the granted UL data/UCI transmission on PUSCH.

If UL frequency selective precoding is configured for the UE (therefore a plurality of PMIs can be included in the DCI), only one PMI is used for SRS. This single PMI for SRS can be one of plurality of PMIs or a separate (additional) PMI.

In another example (example 3), both SRS resource indication and $PMI_{SRS}$ can be used in a DCI (DL- or UL-related) to request a transmission of aperiodic SRS. The SRS resource indication selects 1 out of N resources while $PMI_{SRS}$ indicates the precoder used for the selected SRS resource. Moreover, when the SRS resource indication indicates a request for the UE to transmit SRS in a sweeping manner across N SRS resources, the PMI can indicate the N precoders used for the N SRS resources. The N precoders can be indicated either as a collection of N PMIs or an indicator of precoder group. When a dual-stage codebook (W=W1*W2 where i1 and i2 are used to indicate dual-stage precoder) is used, the first PMI i1 can be interpreted as signaling a precoder group wherein the grouping of the precoders can be predefined. Therefore, the interpretation of the $PMI_{SRS}$ field can depend on the value of SRS resource indication field. That is, when SRS resource indication signals a selection of 1 out of N SRS resources, the $PMI_{SRS}$ signals a chosen precoder for the aperiodic SRS transmission. When SRS resource indication signals a request for sweeping SRS transmission (across N resources), the $PMI_{SRS}$ signals a chosen N-precoder group for aperiodic SRS transmission.

Just as in the previous example (example 2), $PMI_{SRS}$ can either be a second (additional) PMI different from the PMI used for the granted UL transmission on PUSCH or a same PMI as that used for the granted UL data/UCI transmission on PUSCH (termed TPMI in Component 2). For the latter case, the function of the PMI field (either for SRS or for PUSCH data/UCI transmission) can be configured via higher-layer (RRC) signaling (for example, either with an RRC parameter indicating PMI function or a higher-layer indication of SRS type such as 'Non-precoded' or 'Precoded'), MAC CE, or indicated in the same DCI. If indicated in the same DCI, this indicator can either be a separate 1-bit field (for example, called 'PMI Function' field) or jointly encoded into the PMI field. Optionally, when a single PMI is used for SRS and for the granted UL data/UCI transmission on PUSCH, the same precoder indicated by the PMI can be used for (applied to) both SRS and the granted UL data/UCI transmission on PUSCH.

If UL frequency selective precoding is configured for the UE (therefore a plurality of PMIs can be included in the DCI), only one PMI is used for SRS. This single PMI for SRS can be one of plurality of PMIs or a separate (additional) PMI.

The following example embodiments pertain to use cases for the first component (DL CSI framework).

In one example use case (denoted as use case 1.A) for DMRS-based DL dynamic or adaptive beamforming/precoding (with implicit PMI feedback), N=1 DL CSI reporting setting and M=1 RS setting can be used. For the DL CSI reporting setting, the value of BI setting is set to NULL (no BI reporting), the value of PMI setting is set to 'precoder' (where PMI indicates a recommended precoder taken from a codebook), and CQI calculation setting is configured to calculate CQI conditioned upon the reported RI and PMI.

For the RS setting, "RS Type" can be set to "DL CSI-RS" with the number of RS beams/resources K is set to 1. The "RS Function" can either be a 'UE-specific RS' or 'non UE-specific RS' (cell- or gNB-specific). The DL CSI measurement setting links the CSI reporting setting with the RS setting. The configuration for other settings can be chosen flexibly per gNB implementation.

In one example use case (denoted as use case 1.B) for DMRS-based DL beam cycling (with implicit PMI feedback), N=1 DL CSI reporting setting and M=1 RS setting can be used.

For the DL CSI reporting setting, the value of BI setting is set to NULL (no BI reporting), the value of PMI setting is set to 'precoder group' (where PMI indicates a recommended group of precoders taken from a codebook), and CQI calculation setting is configured to calculate CQI conditioned upon the reported RI and PMI assuming that the UE receives a DL data transmission along a group of precoders cycled in time and/or frequency domain.

For the RS setting, "RS Type" can be set to "DL CSI-RS" with the number of RS beams/resources K is set to 1. The "RS Function" can either be a 'UE-specific RS' or 'non UE-specific RS' (cell- or gNB-specific).

The DL CSI measurement setting links the CSI reporting setting with the RS setting. The configuration for other settings can be chosen flexibly per gNB implementation.

In one example use case (denoted as use case 1.C) for DL beam management with K>1 RS beams, N=1 DL CSI reporting setting and M=K RS setting can be used.

For the DL CSI reporting setting, the value of BI setting is set to NULL (no BI reporting), the value of RI setting is set to NULL (no RI reporting), the value of PMI setting is set to NULL (no PMI reporting), and CQI calculation setting is configured to RS signal power analogous to LTE RSRP.

For the RS setting, "RS Type" can be set to "DL CSI-RS" with the number of RS beams/resources as K. The "RS Function" can either be a 'non UE-specific RS' (cell- or gNB-specific) or, optionally, 'beam sweeping' (where K consecutive OFDM symbols are utilized to transmit K DL RS beams/resources).

The DL CSI measurement setting links the N=1 CSI reporting setting with the M=K>1 RS settings. The configuration for other settings can be chosen flexibly per gNB implementation.

In one example use case (denoted as use case 1.D) for virtual sectorization with K>1 RS beams, analogous to LTE Class B with K>1, N=1 DL CSI reporting setting and M=K RS setting can be used.

For the DL CSI reporting setting, the value of BI setting is set to $\{0, 1, \ldots, K-1\}$.

For the RS setting, "RS Type" can be set to "DL CSI-RS" with the number of RS beams/resources as K. The "RS Function" can either be a 'non UE-specific RS' (cell- or gNB-specific).

The DL CSI measurement setting links the N=1 CSI reporting setting with the M=K>1 RS settings. The configuration for other settings can be chosen flexibly per gNB implementation.

In one example use case (denoted as use case 1.E) for explicit (quantized channel) feedback with "partial-port" DL CSI-RS, together with UE-specific beamformed CSI-RS, N=K+1 DL CSI reporting setting and M=K+1 RS setting can be used.

For the first K DL CSI reporting settings, the value of BI setting is set to NULL (no BI reporting), the value of PMI setting is set to 'explicit (where PMI indicates a recommended parametrization of a quantized channel taken from a quantizing codebook), and CQI calculation setting is set to NULL (no CQI reporting). For the last DL CSI reporting setting, the value of BI setting is set to NULL (no BI reporting), the value of PMI setting is set to 'precoder (where PMI indicates a recommended precoder taken from another codebook), and CQI calculation setting is configured to calculate CQI conditioned upon the reported RI and PMI.

For the first K RS settings, "RS Type" can be set to "DL CSI-RS" with the number of RS beams/resources as K (where K denotes the number of partitions and $N_1 + N_2 + \ldots + N_K$ is the total number of DL antenna ports intended for DL transmission). The "RS Function" can be a 'non UE-specific RS' (cell- or gNB-specific). For the last RS setting, "RS Type" can be set to "DL CSI-RS" with one RS beam/resource. The "RS Function" can be a 'UE-specific RS'. The last RS setting can be configured in such a way that the associated RS is transmitted more often than the ones associated with the first K RS settings.

The DL CSI measurement setting links the first K CSI reporting settings with the first K RS settings in a one-to-one manner. It also links the last CSI reporting setting with the last RS setting. The configuration for other settings can be chosen flexibly per gNB implementation.

In one example use case (denoted as use case 1.F) for DMRS-based DL dynamic beamforming assuming DL-UL reciprocity (TDD), N=1 DL CSI reporting setting and M=2 RS setting can be used.

For the DL CSI reporting setting, the value of BI setting is set to NULL (no BI reporting), the value of PMI setting is set to NULL (no PMI reporting), and CQI calculation setting is configured to calculate CQI conditioned upon the reported RI.

For the first RS setting, "RS Type" can be set to "DL CSI-RS" with the number of RS beams/resources K is set to 1. The "RS Function" can either be a 'UE-specific RS' or 'non UE-specific RS' (cell- or gNB-specific). For the second RS setting, "RS Type" can be set to "UL CSI-RS (SRS)" with the number of RS beams/resources K is set to 1. The "RS Function" can either be a 'UE-specific RS' or 'non UE-specific RS' (cell- or gNB-specific).

The DL CSI measurement setting links the single CSI reporting setting with the two RS settings. In this case, the second RS setting (associated with UL CSI-RS/SRS) can be used by the gNB to calculate DL precoders for DL data transmission.

The configuration for other settings can be chosen flexibly per gNB implementation.

Optionally, N=1 DL CSI reporting setting and M=1 RS setting can be used. In this case, the use of a second RS setting (of UL CSI-RS or SRS) is configured apart from DL CSI reporting setting. Therefore, the DL CSI measurement setting links the single CSI reporting setting with the single RS setting of DL CSI-RS.

For the second component (that is, UL CSI acquisition framework), an UL CSI framework is designed partly to facilitate UL CSI acquisition at the gNB/TRP. This involves either UL CSI measurement of UL signal(s) at the gNB/TRP, UL CSI measurement of DL signal(s) at a UE (for DL-UL reciprocity-based operation), or both. Some example embodiments are given as follows.

In one example embodiment, for a single UE, an UL CSI framework includes at least one "signaling setting", at least one "RS setting" (which includes at least one RS used for UL CSI measurements), and one "UL CSI measurement setting". A "signaling setting" configures a UE with a necessary signaling, either DL signaling (via, e.g. DL data or control channel) or UL (via, e.g. UL data or control channel). An RS setting configures a UE with one or more RS resources for the purpose of UL CSI measurement and calculation. For instance, one of the configured RSs can be a DL or UL CSI-RS, which also includes CSI-IM (hence zero power CSI-RS) as a special case. A CSI measurement setting provides linkage/coupling between CSI reporting and RS settings.

It is noted that the above designations (signaling setting, RS setting, and CSI measurement setting) are exemplary and only for illustrative purposes. Other designations can also be used to represent the functionalities.

In a variation of the above embodiment, "signaling setting" can be further split into two settings: "DL signaling setting" and "UL signaling setting".

The "RS setting" used for UL CSI measurement can be the same as that used for DL CSI measurement. Optionally, a separate RS setting can be defined for UL CSI measurement which uses a subset of features or parameters of the RS setting for DL CSI measurement.

Figure 7:
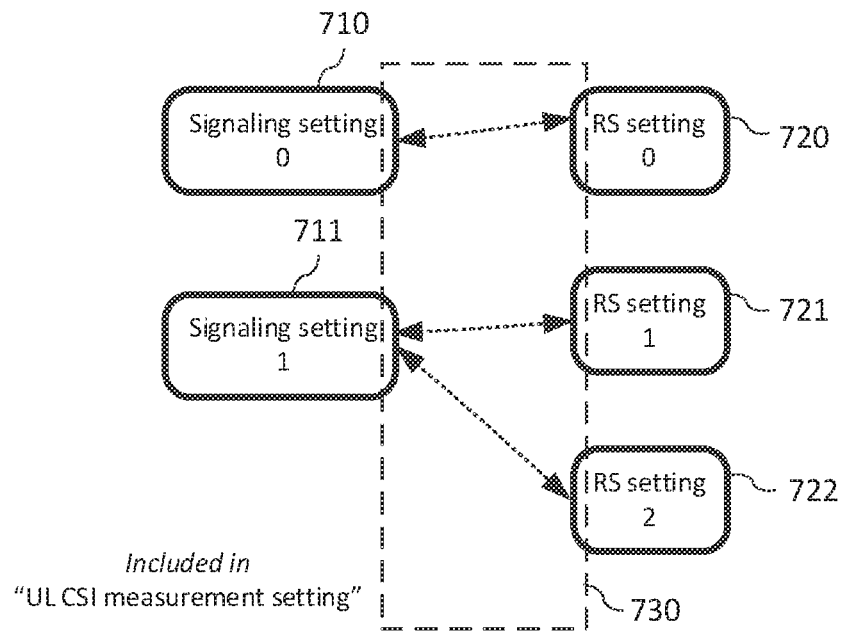
FIG. 7 illustrates an example embodiment for UL with two DL signaling settings and three reference signal settings according to an embodiment of the present disclosure.

For example, when a UE is configured with N signaling settings and M RS settings, the CSI measurement setting links each of the N signaling settings with at least one of the M RS settings. This is illustrated in FIG. 7, where N=2 (DL signaling setting indexed by 0 and 1 which are associated with embodiments 710 and 711, respectively) and M=3 (RS setting indexed by 0, 1, and 2 which are associated with embodiments 720, 721, and 722, respectively).

In this example, the UL CSI measurement setting can be described as follows. The 2 signaling settings and 3 RS settings are linked with CSI measurement setting 730. In this example, signaling setting 0 is linked with RS setting 0 and signaling setting 1 with RS settings 1 and 2. The first link (1-to-1) is applicable in typical UL scenario while the second link (1-to-2) in TDD scenarios where DL-UL reciprocity can be exploited to enable higher-resolution precoding/beamforming at the UE.

In addition to the above linkages, timing relationships between signaling and its corresponding RS can be included in the CSI measurement setting. For instance, when signaling setting 1 (UL signaling) is linked with RS setting 2 (DL CSI-RS), the UE behavior can be defined as follows. When the UE receives an RS associated with RS setting 2 in subframe or slot n, the UE shall report a CSI associated with signaling setting 1 in subframe or slot n+$D_{1-2}$ where the parameter $D_{1-2}$ is configurable. In the example depicted in FIG. 7, signaling setting 1 can share the same design as DL CSI reporting setting in the above Component 1.1.

In addition, especially relevant to UL signaling setting (hence the same as DL CSI reporting setting), measurement restriction (not only the location, but also the extent to which CSI is measured in time domain, frequency domain, or both) associated with each linkage can be included in the CSI measurement setting.

In addition, quasi-colocation (QCL) among more than one antenna ports can be included in the signaling setting.

At least one of (or combination of several of) the above example contents of signaling setting can be chosen to form a signaling setting for UL CSI measurement, either for DL or UL.

In a variation of the above embodiment, instead of utilizing one UL CSI measurement setting which includes all the (L≥1) linkages between N signaling settings and M RS settings, L≥1 separate UL CSI measurement settings (one CSI measurement setting per one linkage) can be utilized. In this case, one CSI measurement setting can include at least one of the following: a linkage, timing relationship, measurement restriction, and/or QCL. Detailed descriptions for utilizing L≥1 CSI measurement settings follow those for one CSI measurement setting.

The above settings can be configured for a UE via higher-layer (RRC) signaling or MAC control element (MAC CE) or L1 control signaling (DL control signaling via a DL control channel). Several possibilities exist. First, all the above settings (signaling setting, RS setting, and UL CSI measurement setting) can be configured either via higher-layer (RRC) signaling or MAC control element (MAC CE). Second, signaling setting and RS setting can be configured either via higher-layer (RRC) signaling, while UL CSI measurement setting can be configured via MAC control element (MAC CE). Third, signaling setting and RS setting can be configured either via higher-layer (RRC) signaling, while UL CSI measurement setting can be configured via L1 control signaling (DL control signaling via a DL control channel). Fourth, signaling setting and CSI measurement setting can be configured via higher-layer (RRC) signaling, while RS setting can be configured via L1 control signaling (DL control signaling via a DL control channel).

UL transmission scheme/method is configured separately. How UL transmission scheme/method is used in conjunction with UL CSI-related setting is gNB implementation.

The following embodiments pertain to a sub-component on the setting for DL or UL signaling (denoted in the present disclosure as sub-component 2.1).

In one example embodiment, "signaling setting" includes a parameter "Signaling Type" (term chosen as an example) which can be configured as either "UL signaling" or "DL signaling" (values chosen as an example). UL signaling includes the use of DL CSI reporting (which is performed via an UL channel) for UL CSI acquisition at the gNB. Therefore, the signaling setting configuration can follow that in Component 1.1 (either precisely or loosely). DL signaling includes signaling of UL transmission parameters (such as transmit precoding matrix indicator, transmit rank indicator, or other relevant UL CSI parameters) via a DL channel (either analogous to LTE UL-related DCI carried via a DL control channel, or control information carried via a DL data channel).

In another embodiment, "signaling setting" can be further split into two settings: "DL signaling setting" and "UL signaling setting". Their interpretations or designs are similar to the above embodiment. In this case, however, the parameter "Signaling Type" in unnecessary.

In yet another embodiment, only DL signaling setting is supported.

Figure 8:
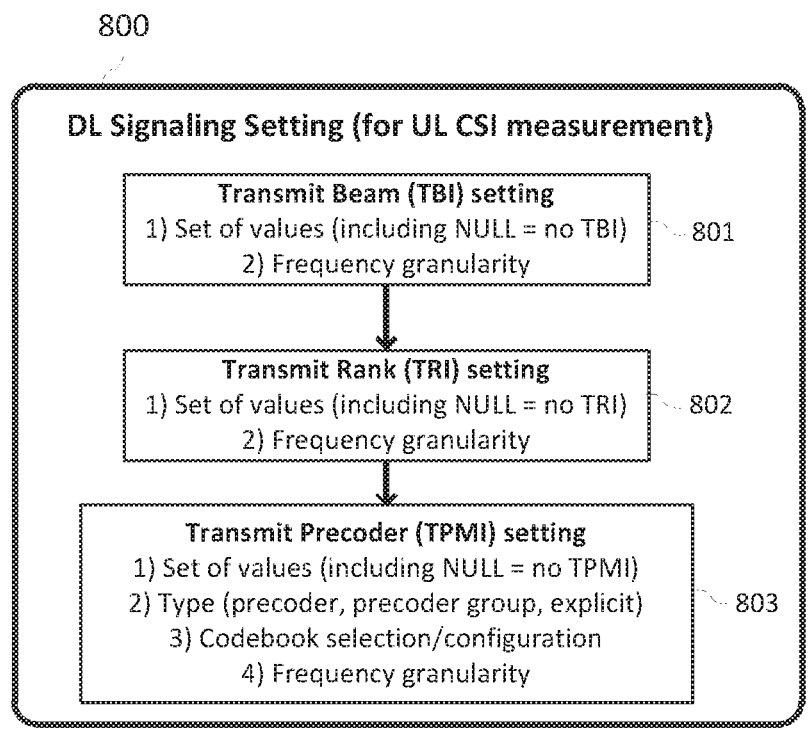
FIG. 8 illustrates an example DL signaling setting according to an embodiment of the present disclosure.

While UL signaling setting can strictly follow Component 1.1, DL signaling setting 800 can take a simpler form as illustrated in FIG. 8 where transmit beam indicator (TBI) setting is configured in 801, transmit rank indicator (TRI) setting in 802, and transmit PMI (TPMI) setting in 803. How each of these three settings is interpreted in analogous to that for DL CSI reporting setting in Component 1.1—with the exception that TBI, TRI, and TPMI are UL transmission parameters rather than UE recommended CSI parameters. These settings impact, for instance, the size of UL-related DCIs and the need for additional DL control signaling (e.g. for signaling subband TBIs, TRIs, and/or TPMIs to support UL frequency selective precoding).

Although DL signaling setting 800 includes three DL signaling parameters, other signaling parameters can also be included (or only a subset of these three parameters can be used, or a subset of these parameters in conjunction with other parameters). The use of three signaling parameters (hence three DL signaling parameter settings) in the preceding and following discussions are exemplary and for illustrative purposes.

Regarding TBI setting, this can be utilized (signaled) when a UE is configured to transmit a K>1 UL CSI-RS or SRS beams/resources. In this case, the gNB measures those K 'sounding' beams and signals the UE the RS beam/ resource (chosen by the gNB) on which the UE shall transmit its UL data. TBI signaling can be turned OFF by setting TBI value to NULL. Analogous to Component 1, a further down-selection of N from K configured SRS resources can be performed. While K resources can be configured via higher-layer (RRC) signaling, the selection of N out of K resources can be configured via MAC CE or L1 DL control signaling (via DCI).

As described in Component 1, an SRS resource indication field can be included in an UL-related DCI. This field can either be separate from TBI or of the same field as TBI, but interpreted differently depending on an additional hypothesis. This additional hypothesis can be a part of the TBI, a separate one-bit DCI field, or a part of SRS transmission request field.

Regarding TRI setting, the value of TRI determines the number of UL data layers transmitted by the UE. When UL SU-MIMO operation is not configured for the UE, TRI signaling can be turned OFF by setting TRI value to NULL (or, optionally, to {1}).

Regarding TPMI setting, the "Type" parameter can be used to configure the UE with either 'precoder', 'precoder group' (for precoder cycling), or 'explicit'—analogous to DL CSI reporting setting in Component 1.1. For UL MIMO, however, 'explicit' may not be necessary. Hence, the "Type" parameter can be set to either 'precoder' or 'precoder group'.

As described in Component 1, a $PMI_{SRS}$ field can be included in an UL-related DCI. This field can either be separate from TPMI or of the same field as TPMI, but interpreted differently depending on an additional hypothesis. This additional hypothesis can be a part of the TPMI, a separate one-bit DCI field, or a part of SRS transmission request field.

The above chosen names are exemplary and for illustrative purposes.

In any of the above examples, the value NULL, indicating non-existence, can be replaced by another value designation which offers a same functionality.

The following example embodiments pertain to use cases for the second component (UL CSI framework).

In one example use case (denoted as use case 2.A) for DMRS-based UL SU-MIMO, N=1 signaling setting (set to 'DL signaling') and M=1 RS setting can be used.

For the DL signaling setting, the value of TBI setting is set to NULL (no BI reporting) and the value of TPMI setting is set to 'precoder' (where TPMI indicates an assigned precoder taken from a codebook) if a regular dynamic beamforming is configured. If precoder cycling is configured, the value of TPMI setting is set to 'precoder group' (where TPMI indicates an assigned group of precoders taken from a codebook). TPMI frequency granularity can indicate whether frequency non-selective or frequency selective precoding/beamforming is configured.

For the RS setting, "RS Type" can be set to "UL CSI-RS/SRS" with the number of RS beams/resources K is set to 1. The "RS Function" can either be a 'Default'.

The UL CSI measurement setting links the DL signaling setting with the RS setting. The configuration for other settings can be chosen flexibly per gNB implementation.

In one example use case (denoted as use case 2.B) for DMRS-based UL SU-MIMO with DL-UL reciprocity (TDD), N=1 signaling setting (set to 'DL signaling') and M=2 RS setting can be used.

For the DL signaling setting, the value of TBI setting is set to NULL (no BI reporting) and the value of TPMI setting is set to 'precoder' (where TPMI indicates an assigned precoder taken from a codebook) if a regular dynamic beamforming is configured. If precoder cycling is configured, the value of TPMI setting is set to 'precoder group' (where TPMI indicates an assigned group of precoders taken from a codebook). TPMI frequency granularity can indicate whether frequency non-selective or frequency selective precoding/beamforming is configured.

For the first RS setting, "RS Type" can be set to "UL CSI-RS/SRS" with the number of RS beams/resources K is set to 1. The "RS Function" can either be a 'Default'.

For the second RS setting, "RS Type" can be set to "DL CSI-RS" with the number of RS beams/resources K is set to 1. The "RS Function" can either be either a 'UE-specific' or a 'non-UE-specific'. Or if the two values are merged into 'Default', it can be set to 'Default.' The purpose of this second RS setting is to assist the UE precoder/beamforming, e.g. so that the UE can refine the beamforming/precoding resolution signaled in DL TPMI.

The UL CSI measurement setting links the DL signaling setting with both the RS settings. The configuration for other settings can be chosen flexibly per gNB implementation.

Optionally, it is also possible to N=1 signaling setting (set to 'DL signaling') and M=1 RS setting (set to 'UL CSI-RS/SRS') while another RS setting set to 'DL CSI-RS' is used without linking it to the DL signaling setting.

In one example use case (denoted as use case 2.C) for UL beam management with K>1 UL CSI-RS (SRS) beams—which is relevant for non-reciprocity scenario—N=1 DL signaling setting and M=K RS setting (set to 'UL CSI-RS/SRS') can be used.

For the DL signaling setting, the value of TBI setting is set to {0, 1, . . . , K–1}.

For the RS setting, "RS Type" can be set to "UL CSI-RS/SRS" with the number of RS beams/resources as K. The "RS Function" can either be a 'Default' or, optionally, 'beam sweeping' (where K consecutive OFDM symbols are utilized to transmit K UL CSI-RS/SRS beams/resources).

The UL CSI measurement setting links the N=1 DL signaling setting with the M=K>1 RS settings. The configuration for other settings can be chosen flexibly per gNB implementation.

For the third component (that is, another DL CSI acquisition framework), several example embodiments are given as follows.

In some embodiments, a flexible CSI reporting framework is supported in advanced communication systems such as 5G or new radio (NR). In this framework, a UE is configured with a CSI reporting mode or configuration, which includes the following modules.

A first module 0 includes CSI-RS and CSI-IM configuration. The CSI reporting configuration includes K downlink reference signals (CSI-RS) for estimation of channel state information (CSI), where K>1. The time and frequency domain CSI-RS patterns in a PRB where CSI-RSs are located can also be configured by the TRP. The pattern may be the same for all K CSI-RSs or it may be different for a subset/all of them. The set of configurable time-frequency CSI-RS patterns may or may not include for CSI-RS patterns in LTE (up to Rel. 14).

Figure 9A:
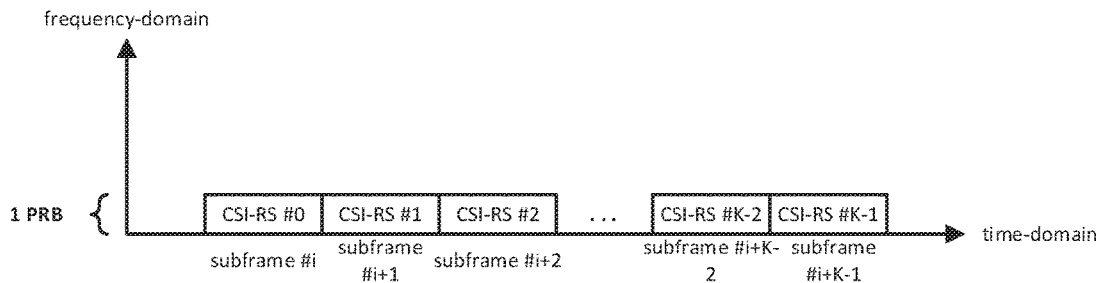
FIG. 9A illustrates a consecutive time-domain RS multiplexing scheme according to an embodiment of the present disclosure.
Figure 9B:
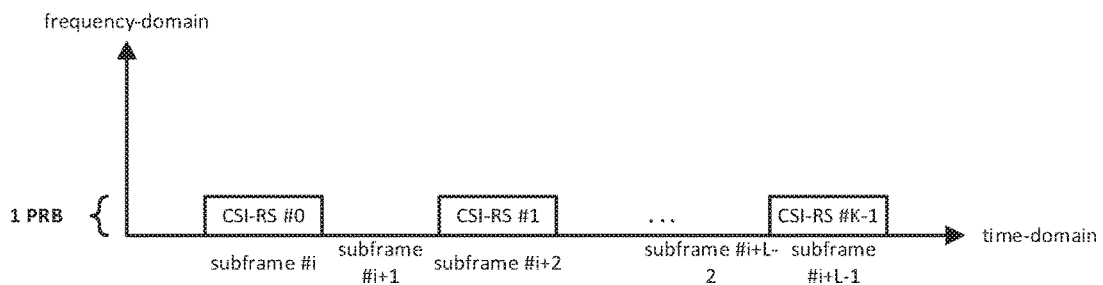
FIG. 9B illustrates a non-consecutive time-domain RS multiplexing scheme according to an embodiment of the present disclosure.
Figure 9C:
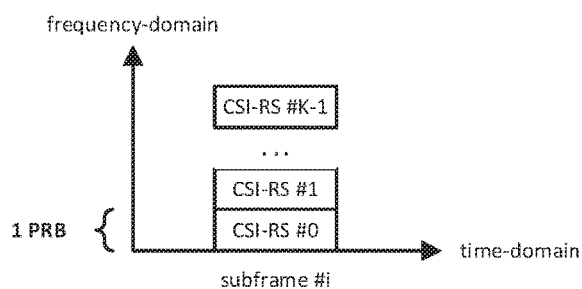
FIG. 9C illustrates a frequency-domain RS multiplexing scheme according to an embodiment of the present disclosure.

The multiplexing of K CSI-RS can also be configurable by the TRP. For example, one of the following time-domain (subframe/slot index) or/and frequency-domain (PRB index) multiplexing can be configured. The K CSI-RS can be multiplexed in time-domain, either in consecutive or non-consecutive subframes/slots. Examples illustrating the two time-domain multiplexing patterns are shown in FIGS. 9A and 9B, respectively. The K CSI-RS can also be multiplexed in frequency-domain. An example illustrating the frequency-domain multiplexing is shown in FIG. 9C, where each CSI-RS is transmitted in at least one PRB. Another example of frequency-domain multiplexing is, in some of the PRBs, one or multiple CSI-RSs can be transmitted in the same PRB. The K CSI-RS can also be multiplexed in both time-domain and frequency-domain. A combination of the previous two multiplexing methods can be configured by the TRP for CSI-RS transmission.

Each CSI-RS can be configured as either cell-specific or TRP-specific or UE-specific or non-UE-specific separately and flexibly by the TRP or by the network. For example, K CSI-RS can either be all UE-specific, or all non-UE-specific, or a mixture of UE-specific and non-UE-specific. In another example, K CSI-RS is configured to be transmitted from a single TRP or optionally, a subset of them can be transmitted from one TRP and another subset from a different TRP.

Each CSI-RS can also be configured with the number of ports to be associated with. The configuration of the number of ports can be separate or common for all K CSI-RS, or separate for a subset of K CSI-RS and common for the remaining CSI-RS.

In addition to CSI-RS, the UE can also be configured with CSI-IM resource for interference measurement. The configuration for CSI-IM about the time-domain and frequency-domain locations within a PRB, about the time-domain and frequency-domain multiplexing method, about the cell-/TRP-/UE-/non-UE-specific features, and about the number of ports for transmission can be similar to those for CSI-RS mentioned earlier.

The CSI-RS or/and CSI-IM transmission may further be configured as either periodic after every T subframes/slots or aperiodic on-demand. For instance, a subset of K CSI-RS can be transmitted periodically and another subset can be transmitted aperiodically.

A second module includes CSI report or MIMO type configuration (termed eMIMO-Type configuration in the present disclosure).

Each CSI-RS can be associated with the same or different CSI reportings or eMIMO Types. Examples of eMIMO-Types include Class A, Class B, K>1, and Class B, K=1 as in LTE Rel. 13 or new eMIMO-Types, in any, in Rel. 14.

The CSI report, generated based on each CSI-RS, can be configured to include at least one of the CSI contents such as a precoding matrix indicator (PMI), a channel quality indicator (CQI), a rank indicator (RI), a CSI resource indicator (CRI), a beam indicator (BI), a beam group indicator (BGI), and linear combination coefficient indicator (LCCI). The time and frequency domain granularities of CSI can be further configured as well. The reporting of CSI components in each CSI report can either be fixed (e.g. WB or SB) or configured to be one of WB and SB.

The K CSI reports or subsets of the K CSI reports can be configured to be generated independently or dependently. For example, L (L≤K) of the CSI reports, generated based on the L CSI-RSs, can be configured to be generated independently from each other, and the rest K–L CSI reports, generated based on the remaining K–L CSI-RSs, can be configured to be generated dependently.

In the proposed flexible CSI reporting configuration, the CSI type can be further configured to be one of implicit, explicit, analog, or semi-dynamic.

If the CSI type is configured to be implicit, at least one of CQI/PMI/RI/CRI is reported based on a codebook similar to LTE. For example, the CSI comprising a single PMI is reported using a single-stage codebook such as LTE Rel. 8 2-Tx, Rel. 10 4-Tx, and Rel. 12 Class B codebooks. In an another example, a pair of PMIs (PMI1,PMI2) is reported using a dual-stage codebook $W=W_1W_2$ such as LTE Rel. 10 8-Tx, Rel. 12 4-Tx, Rel. 13 Class A codebooks. In this dual-stage codebook, the first PMI (PMI1) indicates a wideband beam group, and the second PMI (PMI2) selects a beam from the indicated beam group and determines a co-phase value for the two polarizations (assuming cross-polarized antenna ports used at TRPs). In yet another example, the dual-stage codebook is a linear combination (LC) codebook, wherein the first PMI (PMI1) indicates a wideband beam group and the second PMI (PMI2) indicates linear combination coefficients (and co-phase) to combine the beams in the indicated beam group.

If the CSI reporting is configured to be explicit, the CSI corresponds to at least one of the full information of the channel, dominant eigenvectors (with or without corresponding eigenvalues), and the covariance matrix. To reduce overhead and complexity of the explicit CSI reporting, a reduced dimensional form of the explicit CSI can be configured to be reported. For example, the linear combination of basis vectors representing explicit CSI such as eigenvectors can be configured to be reported as the reduced dimension explicit CSI, instead of the full explicit CSI.

If the CSI reporting is configured to be reported for semi-dynamic beamforming, the reported CSI indicates the information about a group of beams. For example, the CSI can be configured to be reported using the first stage $W_1$ codebook of the dual-stage codebook used for implicit CSI reporting. In this example, only PMI1 indicating a wideband beam group is reported in the CSI.

A third module includes CQI calculation configuration.

In the proposed flexible CSI reporting configuration, for each CSI reporting or eMIMO-Type, CQI reporting can also be configured where the reported CQI can be wideband (WB) or subband (SB). If the CQI is configured to be reported in the CSI report, the CQI calculation method can be further configured. The configuration of CQI calculation can be either dependent with or independent with transmission scheme. For example, the configured CQI calculation method may correspond to one of dynamic beamforming, semi-dynamic beamforming, or transmit-diversity-based transmission schemes, as in LTE. For instance, if the CQI calculation method corresponds to dynamic beamforming, a single precoder or beamformer is assumed in the CQI calculation (WB or for each SB). If the CQI calculation method corresponds to a semi-dynamic beamforming, multiple precoders or beamformers are considered in the CQI calculation, where multiple precoders can be assumed to cycle, for example across RBs or REs. If the CQI calculation method corresponds be transmit-diversity-based transmission, CSI can be calculated assuming a, transmit diversity scheme such as Space-Frequency Block Coding (SFBC) and Frequency Switched Transmit Diversity (FSTD). For another example, the configured CQI calculation method can be independent of the transmission schemes, and configured by the TRP directly. For instance, the CQI calculation method can be configured as a single precoder or multiple precoder with cycling across RBs or REs.

A fourth module includes a rank indicator (RI) indicator. In the proposed flexible CSI reporting configuration, for each CSI reporting or eMIMO-Type, RI reporting can also be configured. The configuration of RI can be independent with the configuration of other CSI reporting components, or can be dependent on the configuration of other CSI reporting components. For example, if the CSI type is configured to be implicit, RI is configured to be reported in the CSI report. In another example, if the CSI type is configured to be explicit representing downlink channel, RI reporting is not configured. In yet another example, if the CSI type is configured to be semi-dynamic, RI reporting is either configured or not configured (e.g. RI=1 in this later case).

A fifth module includes, in the flexible CSI reporting configuration scheme, each of the K CSI reporting or eMIMO-Types is configurable by the TRP to be one of periodic, semi-persistent or aperiodic. Similar to LTE, an example of periodic CSI reporting is PUCCH based reporting and an example of aperiodic CSI reporting is PUSCH based reporting.

If the CSI reporting type is configured to be periodic, the duty cycle (or period) in time domain granularity can also be configurable by the TRP. In addition, if a CSI report includes multiple CSI components which are configured to be reported separately in multiple periodic CSI reporting instances, then for each CSI component, periodicity and offset are also configured, where the periodicity and offset of one CSI component such as CQI/PMI may be defined with respect to another CSI component such as RI.

If the CSI reporting type is configured to be aperiodic, the time domain (subframe or slot) and frequency domain (PRBs) location to report CSI are also configured by the TRP.

A sixth module includes panel configuration. In the flexible CSI reporting configuration scheme, the number of antenna panels at the TRP can be configured by the TRP and indicated to the UE to derive/report the CSI report. The configuration of number of panels can correspond to either a single panel or multiple panels. For example, for millimeter wave 5G or NR communication systems, multiple (e.g. 4) antenna panels can be arranged in a 2D (e.g. 2-by-2) structure, and this arrangement can be indicated to the UE to help generate the CSI report. In one example of multi-panel, the UE is also configured to derive or/and report CSI for each panel separately. In another example, the UE is configured to derive or/and report CSI for each panel jointly.

A seventh module includes CSI reporting BW configuration. In the flexible CSI reporting configuration scheme, the bandwidth or set of (consecutive or distributed) PRBs that CSI report corresponds to can be configured by the TRP and indicated to the UE. The configuration of CSI report bandwidth can be either the whole bandwidth, or a portion of the bandwidth. For example, the TRP can indicate a particular UE to report the CSI on a desire part of the bandwidth, and can indicate another UE to report the CSI on another part of the bandwidth. This bandwidth information is configured by the TRP and helps the UE to generate the corresponding CSI report.

An eight module includes RF beamforming configuration. In the flexible CSI reporting configuration scheme, if the TRP has a hybrid beamforming architecture (e.g. 5G or NR millimeter wave communication system), the CSI reporting process for the TRP RF beamforming can be configured to be either independent of the CSI reporting process for the digital beamforming, or joint with the CSI reporting process for the digital beamforming.

If the CSI reporting process for the TRP RF beamforming is configured to be independent of the CSI reporting process for the digital beamforming, two separate CSI reporting processes are performed. The CSI reporting process associated with the digital beamforming is analogous to LTE, and the CSI reporting process associated with the RF beamforming is an independent process.

If the CSI reporting process for the TRP RF beamforming is configured to be joint with the CSI reporting process for the digital beamforming, only a single CSI reporting process is performed, in which, for example, the RF beam selection is first performed in the joint process followed by the digital beam.

In the flexible CSI reporting configuration scheme, if the UE also has a hybrid beamforming architecture, the CSI reporting process for the UE RF beamforming can also be configured. The UE RF beamforming configuration can be either independent or joint with the digital beamforming, analogous to the TRP RF beamforming. The UE RF beamforming configuration can be either independent or joint with the TRP RF beamforming configuration.

A ninth module includes configuration pertaining to network coordination, that is, setups for single or multiple TRPs. In the flexible CSI reporting configuration scheme, the configuration of CSI reporting can be from either single or multiple TRPs. If the configuration is from multiple TRPs, the CSI configuration method, CSI derivation method, and CSI reporting method in each configuration component can be further configured to be either independent from each other, or joint with subset or all the other configuration components.

In one embodiment, a UE is configured with a CSI reporting mode or configuration which includes all or some of the abovementioned CSI configuration modules 0-8.

In another embodiment, some of the abovementioned CSI configuration modules 0-8 may be common to all possible CSI configurations. For example, the beam group selection may be common to all CSI reporting modes.

Figure 10:
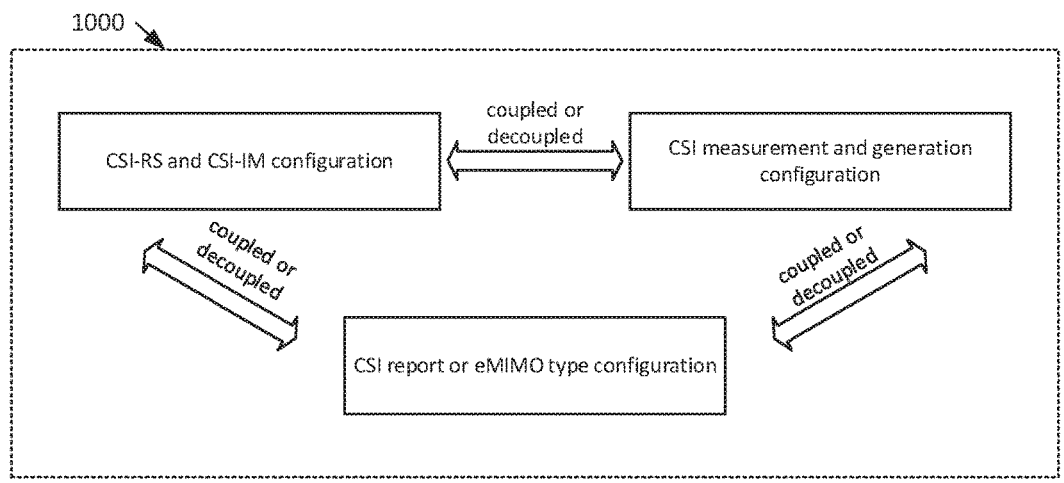
FIG. 10 illustrates an example relationship among three groups for CSI reporting configuration according to an embodiment of the present disclosure.

In another embodiment, the abovementioned CSI configuration modules 0-8 can be divided into three groups for the CSI reporting process: CSI-RS configuration, CSI measurement and generation configuration, and CSI report or eMIMO-type configuration. The dependence of the three groups or a subset of the three groups is configurable as either coupled or decoupled. A diagram 1000 illustrating the relationship of groups is shown in FIG. 10.

Figure 11:
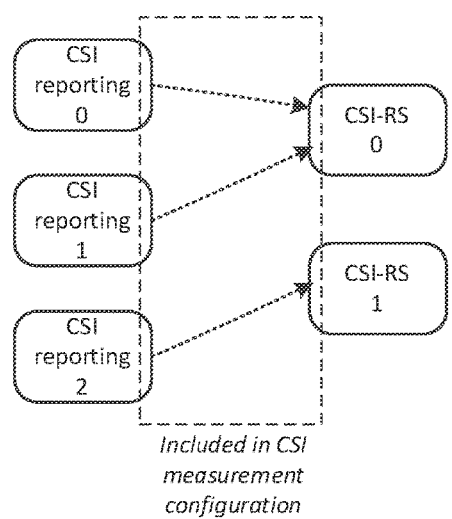
FIG. 11 illustrates an example embodiment for DL with two DL signaling settings snd two reference signal settings according to an embodiment of the present disclosure.

In another embodiment, the CSI measurement and generation configuration includes the mapping linked between N CSI reporting configurations and M CSI-RS configurations, where N and M may not be the same and one-to-one is not necessary. For instance, FIG. 11 illustrates an example of CSI-RS and CSI reporting mapping for N=3 (n=0, 1, 2) and M=2 (m=0, 1), where the links are configured as: CSI reporting configured in settings 0 and 1 are calculated based on a CSI-RS measurement configured in CSI-RS setting 0 (0→0, and 1→0 in the figure), while CSI reporting configured in setting 2 is calculated based on a CSI-RS measurement configured in CSI-RS setting 1 (2-1 in diagram 1100). These links can be included in CSI measurement configuration. The CSI measurement and generation configuration can also include measurement restriction or QCL (if applicable) for each mapping link. For example, the restriction can include the timing relations between CSI reporting and CSI-RS, which is optionally a part of transmission scheme configuration (e.g. in LTE).

The below discussion focuses on the CSI report or eMIMO-type configuration.

In another embodiment, the CSI reporting configuration can include a mode (either be periodic, aperiodic or semi-persistent), a subframe or slot configuration in periodicity and offset, and CSI parameter configurations (e.g. BI, RI, PMI, and CQI). An example illustrating this configuration is shown in settings 600 of FIG. 6. In this example, if BI reporting is not configured as NULL, RI is calculated conditioned on the reported (or assumed) BI. Likewise, PMI is calculated conditioned on the reported (or assumed) BI and/or RI. And CQI is calculated conditioned on the reported (or assumed) BI, RI, and/or PMI.

In another embodiment, the configuration of CSI reporting parameters included in the modules is decoupled with the transmission scheme. How transmission scheme/method is used in conjunction with CSI-related setting is TRP implementation. The CSI reporting parameters can be configured independently or dependently with each other, regardless of the transmission scheme. For example, the UE can be configured with the CSI reporting parameters including:

CQI config='OFF';
CQI F=--;
PMI config='channel';

PMI F='subband';
RI config='OFF';
CRI config='OFF';
where in this example, the UE can be configured with explicit feedback and full channel information is reported. For another example, the UE can be configured with the CSI reporting parameters including:
CQI config='OFF';
CQI F=--;
PMI config='eigenvectors';
PMI F='subband';
RI config='ON';
CRI config='OFF';
where in this example, the UE can be configured with explicit feedback and eigenvectors are reported. For another example, the UE can be configured with the CSI reporting parameters including:
CQI config='single beam';
CQI F='subband';
PMI config='implicit;
PMI F='subband';
RI config='ON';
CRI config='ON';
where in this example, the UE can be configured with implicit feedback. For another example, the UE can be configured with the CSI reporting parameters including:
CQI config='cycle';
CQI F='subband';
PMI config='beam group';
PMI F='wideband';
RI config='ON';
CRI config='OFF';
where in this example, the UE can be configured with semi-dynamic/semi-open-loop feedback. For another example, the UE can be configured with two sets of CSI reporting parameters as follows:
Configuration 1
CQI config='OFF';
CQI F=--;
PMI config='implicit';
PMI F='wideband';
RI config='ON';
CRI config='OFF';
eMIMO-type config='Class A';
Configuration 2
CQI config='single beam';
CQI F='subband';
PMI config='implicit';
PMI F='subband';
RI config='ON';
CRI config='ON';
eMIMO-type config='Class B';
where in this example, the UE can be configured with Class A eMIMO-type reporting using the fist configuration, and configured with Class B eMIMO-type reporting using the second configuration. The dependence between the two configurations can also be configurable. For instance, the two configurations can be configured to be transparent to each other. For another example, the second configuration can be configured to depend on the first configuration.

In another embodiment, some configurable CSI reporting modes may only support a subset of the combinations of the above modules 0-8, which means the configuration of a module may rely on the configuration of other modules. This dependence can avoid the duplication of functionalities in CSI reporting configuration. For example, if a UE is configured with explicit CSI type (module 1), it may not be configured with periodic CSI reporting type but only aperiodic CSI reporting type (module 4). For another example, periodic or semi-persistent CSI reporting type (module 4) can only be configured with wideband reporting (module 6), and aperiodic CSI reporting type (module 4) can only be configured with subband reporting (module 6).

In another embodiment, if a CSI reporting configuration does not configure one (module X) of modules 0-8 and to derive the CSI that module X is needed, a default configuration for module X can be assumed to derive the CSI report. For example, if RI reporting (module 3) is not configured by the TRP, the UE can consider the RI is configured to be 1 by default and generate the CSI report.

In another embodiment, a UE may only be capable of supporting a subset from the set of all CSI reporting configurations, and the TRP is aware of the UE's capability of CSI reporting. The TRP can only configure a CSI reporting configuration within the capability of the UE. For example, the UE may not be capable of explicit (high-resolution) CSI reporting (module 1), hence, the TRP shall not configure this UE with any CSI reporting configuration that includes explicit CSI type.

In another embodiment, a UE may be capable of supporting multiple CSI reporting configurations, and the TRP is aware of this. Then, the TRP can indicate one of the supported CSI reporting configurations to the UE, and the UE will generate the CSI report based on the configured CSI reporting configuration. For example, the UE may support both explicit and implicit CSI types, and the TRP schedules the UE with SU transmission and configures it with implicit CSI type. Hence, the UE will generate the CSI report corresponding to the implicit CSI type, even though it has the capability to generate the CSI report corresponding to the explicit CSI type.

In another embodiment, after gathering the CSI reports including multiple modules of CSI reporting configurations, the transmission schemes or methods can be selected, where examples of transmission schemes and methods may include spatial multiplexing (e.g. beamforming and precoder cycling), and transmit diversity (e.g. SFBC).

Figure 12:
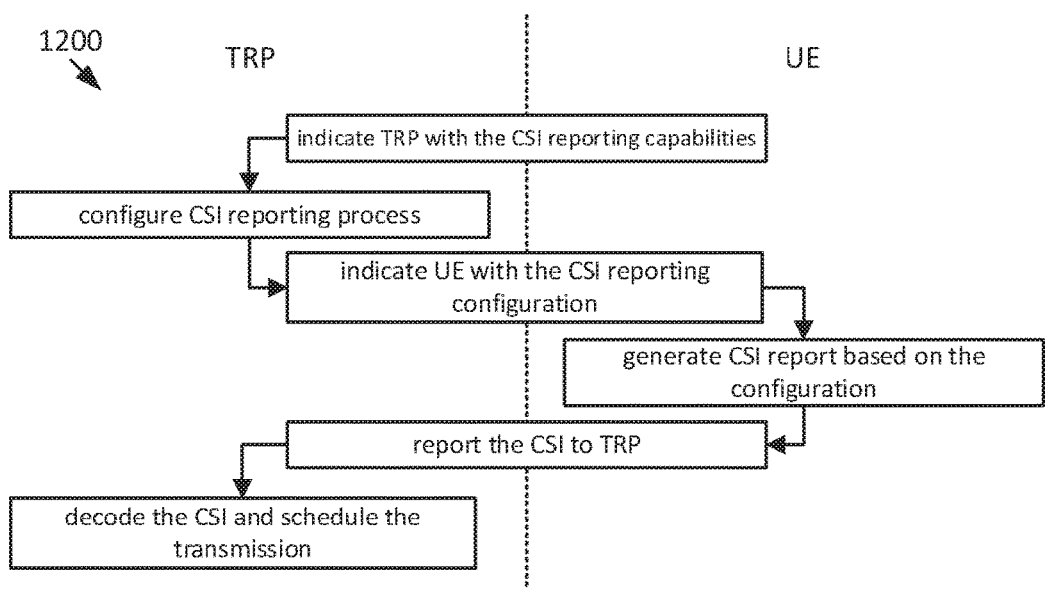
FIG. 12 illustrates a process of configurable CSI reporting according to an embodiment of the present disclosure.

A flow chart illustrating the process 1200 of configurable CSI reporting is shown in FIG. 12. After the TRP is aware of UE's capabilities on the CSI reporting, it configures the CSI reporting process including the CSI-RS/CSI-IM configuration, CSI measurement and calculation configuration, and CSI report or eMIMO-type configuration, and indicates the configuration to the UE. The UE measures and generate the CSI reports based on the configuration, and reports the configured CSI to the TRP. The TRP schedules the next transmission based on the CSI reports.

In another embodiment, the flexible CSI reporting configuration can be signaled by a single or multiple TRPs for fast acquisition of CSI. For example, the CSI reporting configuration can be configured by a single TRP, where the CSI reporting configuration information is transmitted in DCI through PDCCH to the target UE. In another example, the CSI reporting configuration can be configured by multiple TRPs, where the CSI reporting configuration information is transmitted in the DCI of each TRP through PDCCH to the target UE.

In another embodiment, the flexible CSI reporting configuration can also be signaled by the higher layer in a semi-static way. For example, the CSI reporting configuration can be configured by Radio Resource Control (RRC).

Figure 13:
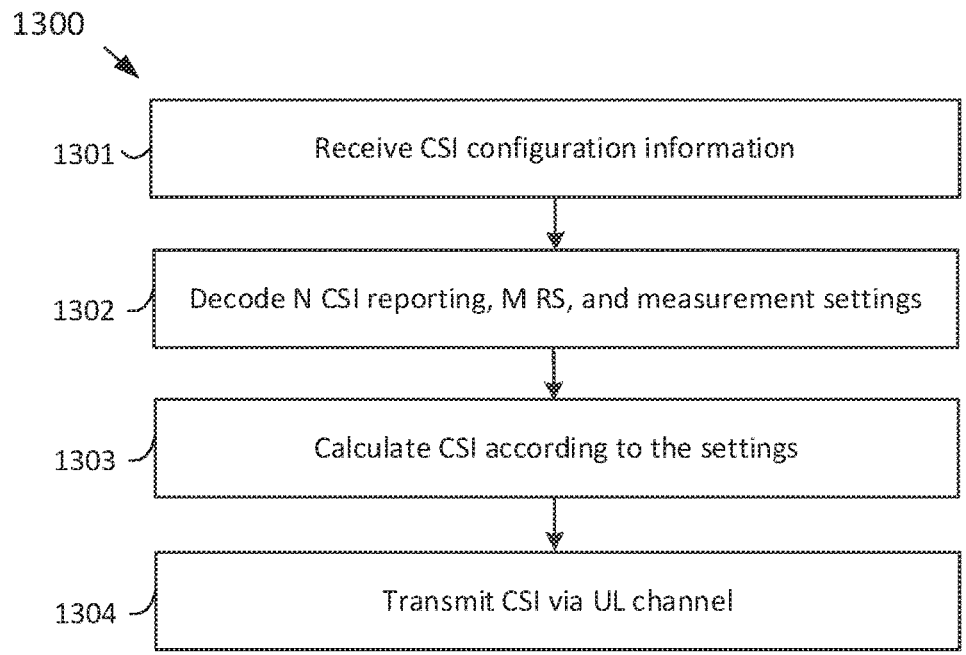
FIG. 13 illustrates a flowchart for an example method wherein a UE receives configuration information for channel state information (CSI) calculation and reporting according to an embodiment of the present disclosure.

FIG. 13 illustrates a flowchart for an example method 1300 wherein a UE receives configuration information for channel state information (CSI) calculation and reporting according to an embodiment of the present disclosure. For example, the method 1300 can be performed by the UE 116.

The method 1300 begins with the UE receiving configuration information for channel state information (CSI) calculation and reporting, wherein the configuration includes N≥1 CSI reporting settings, M≥1 reference signal (RS) settings, and a measurement setting (step 1301). The measurement setting includes linkages between the CSI reporting settings and the RS settings, wherein CSI reporting associated with the CSI reporting setting is calculated based on measuring a reference signal (RS) associated with the RS setting. Therefore, a linkage determines the dependence of CSI measurement and calculation on the RS associated with the RS setting. The RS setting is configured for either channel measurement or interference measurement. The CSI reporting setting configures the CSI reporting to be reported in a periodic, aperiodic, or semi-persistent manner. Likewise, the RS setting is associated with CSI-RS which is configured to be measured in a periodic, aperiodic, or in semi-persistent manner. The CSI reporting setting includes a CSI parameter setting for at least channel quality indicator (CQI), precoding matrix indicator (PMI), rank indicator (RI), or CSI-RS resource indicator (CRI). The configuration information is received via higher-layer signaling. The UE decodes the CSI configuration information (step 1302). The decoded information is utilized to calculate CSI reports (step 1303). The calculated CSI reports are then transmitted on an uplink (UL) channel (step 1304).

Figure 14:
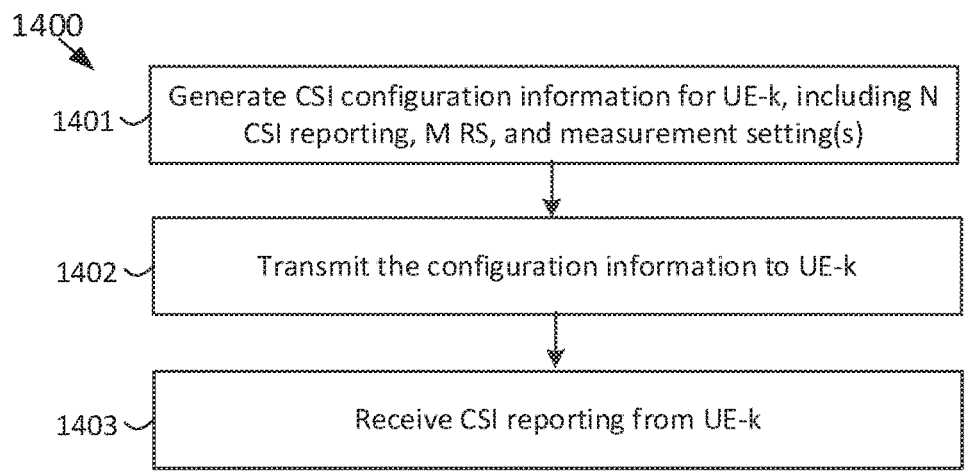
FIG. 14 illustrates a flowchart for an example method wherein a BS generates configuration information for channel state information (CSI) calculation and reporting for a UE (labeled as UE-k) according to an embodiment of the present disclosure.

FIG. 14 illustrates a flowchart for an example method 1400 wherein a BS generates configuration information for channel state information (CSI) calculation and reporting for a UE (labeled as UE-k) according to an embodiment of the present disclosure. For example, the method 1400 can be performed by the BS 102.

The method 1400 begins with the BS generating, for UE-k, configuration information for channel state information (CSI) calculation and reporting, wherein the configuration includes N≥1 CSI reporting settings, M≥1 reference signal (RS) setting, and a measurement setting (step 1401).

The measurement setting includes linkages between the CSI reporting settings and the RS settings, wherein CSI reporting associated with the CSI reporting setting is calculated based on measuring a reference signal (RS) associated with the RS setting. Therefore, a linkage determines the dependence of CSI measurement and calculation on the RS associated with the RS setting. The RS setting is configured for either channel measurement or interference measurement. The CSI reporting setting configures the CSI reporting to be reported in a periodic, aperiodic, or semi-persistent manner. Likewise, the RS setting is associated with CSI-RS which is configured to be measured in a periodic, aperiodic, or in semi-persistent manner. The CSI reporting setting includes a CSI parameter setting for at least channel quality indicator (CQI), precoding matrix indicator (PMI), rank indicator (RI), or CSI-RS resource indicator (CRI). The configuration information is received via higher-layer signaling. The BS then transmits to UE-k the CSI configuration information (step 1402) and receives CSI reports from UE-k via an uplink (UL) channel (step 1403).

Although FIGS. 13 and 14 illustrate examples of methods for receiving configuration information and configuring a UE, respectively, various changes could be made to FIGS. 13 and 14. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive, from a base station (BS) via radio resource control (RRC) signaling, configuration information including a channel state information (CSI) reporting configuration and a CSI resource configuration,
wherein the CSI reporting configuration includes:
information associated with a CSI reporting type which is one of periodic, semi-persistent, or aperiodic; and
information associated with a set of physical resource blocks (PRBs) for which CSI is reported; and
wherein the CSI resource configuration includes:
information associated with locations of CSI-reference signals (CSI-RSs) in a time domain and a frequency domain; and
information associated with indicating a number of CSI-RS ports; and
a processor operably connected to the transceiver, the processor configured to decode the configuration information and determine CSI based on the CSI reporting configuration and the CSI resource configuration,
wherein the transceiver is further configured to transmit the determined CSI on an uplink (UL) channel.

2. The UE of claim 1, wherein the CSI resource configuration includes information associated with CSI-interference measurement (CSI-IM) resources for interference measurement.

3. The UE of claim 1, wherein the CSI resource configuration further includes:
information associated with a CSI-RS type which is one of periodic, aperiodic, or semi-persistent;
information associated with a periodicity and an offset for CSI-RSs; and
information associated with an energy-per resource element (EPRE) for CSI-RS.

4. The UE of claim 1, wherein the CSI reporting configuration further includes information associated with at least one CSI component to report including at least one of a channel quality indicator (CQI), a precoding matrix indicator (PMI), a rank indicator (RI), or a CSI resource indicator (CRI).

5. The UE of claim 4, wherein the CSI reporting configuration further includes:
information associated with a frequency granularity related PMI which is one of wideband and subband; and
information associated with a frequency granularity related CQI which is one of wideband and subband.

6. A base station (BS) comprising:
a processor configured to generate configuration information including a channel state information (CSI) reporting configuration and a CSI resource configuration,
wherein the CSI reporting configuration includes:
information associated with a CSI reporting type which is one of periodic, semi-persistent, or aperiodic; and
information associated with a set of physical resource blocks (PRBs) for which CSI is reported; and wherein the CSI resource configuration includes:
information associated with locations of CSI-reference signals (CSI-RSs) in a time domain and a frequency domain; and
information associated with indicating a number of CSI-RS ports;
a transceiver operably connected to the processor, the transceiver configured to:
transmit, to a user equipment (UE), the configuration information via radio resource control (RRC) signaling; and
receive, from the UE, CSI based on the CSI reporting configuration and the CSI resource configuration.

7. The BS of claim 6, wherein the CSI resource configuration includes information associated with CSI-interference measurement (CSI-IM) resources for interference measurement.

8. The BS of claim 6, wherein the CSI resource configuration further includes:
information associated with a CSI-RS type which is one of periodic, aperiodic, or semi-persistent;
information associated with a periodicity and an offset for CSI-RSs; and
information associated with an energy-per resource element (EPRE) for CSI-RS.

9. The BS of claim 6, wherein the CSI reporting configuration further includes information associated with at least one CSI component to report including at least one of a channel quality indicator (CQI), a precoding matrix indicator (PMI), a rank indicator (RI), or a CSI resource indicator (CRI).

10. The BS of claim 9, wherein the CSI reporting configuration further includes:
information associated with a frequency granularity related PMI which is one of wideband and subband; and
information associated with a frequency granularity related CQI which is one of wideband and subband.

11. A method for operating a user equipment (UE), the method comprising:
receiving, by the UE from a base station (BS) via radio resource control (RRC) signaling, configuration information including a channel state information (CSI) reporting configuration and a CSI resource configuration,
wherein the CSI reporting configuration includes:
information associated with a CSI reporting type which is one of periodic, semi-persistent, or aperiodic; and
information associated with a set of physical resource blocks (PRBs) for which CSI is reported; and
wherein the CSI resource configuration includes:
information associated with locations of CSI-reference signals (CSI-RSs) in a time domain and a frequency domain; and
information associated with indicating a number of CSI-RS ports;
decoding, by the UE, the configuration information;
determining, by the UE, CSI based on the CSI reporting configuration and the CSI resource configuration; and
transmitting, by the UE, the determined CSI on an uplink (UL) channel.

12. The method of claim 11, wherein the CSI resource configuration includes information associated with CSI-interference measurement (CSI-IM) resources for interference measurement.

13. The method of claim 11, wherein the CSI resource configuration further includes:
information associated with a CSI-RS type which is one of periodic, aperiodic, or semi-persistent;
information associated with a periodicity and an offset for CSI-RSs; and
information associated with an energy-per resource element (EPRE) for CSI-RS.

14. The method of claim 11, wherein the CSI reporting configuration further includes information associated with at least one CSI component to report including at least one of a channel quality indicator (CQI), a precoding matrix indicator (PMI), a rank indicator (RI), or a CSI resource indicator (CRI).

15. The method of claim 14, wherein the CSI reporting configuration further includes:
information associated with a frequency granularity related PMI which is one of wideband and subband; and
information associated with a frequency granularity related CQI which is one of wideband and subband.

16. A method for operating a base station (BS), the method comprising:
generating configuration information including a channel state information (CSI) reporting configuration and a CSI resource configuration,
wherein the CSI reporting configuration includes:
information associated with a CSI reporting type which is one of periodic, semi-persistent, or aperiodic; and
information associated with a set of physical resource blocks (PRBs) for which CSI is reported; and
wherein the CSI resource configuration includes:
information associated with locations of CSI-reference signals (CSI-RSs) in a time domain and a frequency domain; and
information associated with indicating a number of CSI-RS ports;
transmitting, to a user equipment (UE), the configuration information via radio resource control (RRC) signaling; and
receiving, from the UE, CSI based on the CSI reporting configuration and the CSI resource configuration.

17. The method of claim 16, wherein the CSI resource configuration includes information associated with CSI-interference measurement (CSI-IM) resources for interference measurement.

18. The method of claim 16, wherein the CSI resource configuration further includes:
information associated with a CSI-RS type which is one of periodic, aperiodic, or semi-persistent;
information associated with a periodicity and an offset for CSI-RSs; and
information associated with an energy-per resource element (EPRE) for CSI-RS.

19. The method of claim 16, wherein the CSI reporting configuration further includes information associated with at least one CSI component to report including at least one of a channel quality indicator (CQI), a precoding matrix indicator (PMI), a rank indicator (RI), or a CSI resource indicator (CRI).

20. The method of claim 19, wherein the CSI reporting configuration further includes:
information associated with a frequency granularity related PMI which is one of wideband and subband; and
information associated with a frequency granularity related CQI which is one of wideband and subband.

* * * * *